US012650155B1

(12) United States Patent
Kim

(10) Patent No.: US 12,650,155 B1
(45) Date of Patent: Jun. 9, 2026

(54) SHOCK-ABSORBING SYSTEM AND METHOD

(71) Applicant: Kevin Chong Kim, Holmdel, NJ (US)

(72) Inventor: Kevin Chong Kim, Holmdel, NJ (US)

( * ) Notice: Subject to any disclaimer, the term of this patent is extended or adjusted under 35 U.S.C. 154(b) by 0 days.

(21) Appl. No.: 19/198,921

(22) Filed: May 5, 2025

(51) Int. Cl.
 *F16F 9/512* (2006.01)
 *A42B 3/06* (2006.01)

(52) U.S. Cl.
 CPC ............... *F16F 9/512* (2013.01); *A42B 3/06* (2013.01); *F16F 2222/126* (2013.01); *F16F 2230/0047* (2013.01); *F16F 2230/08* (2013.01)

(58) Field of Classification Search
 CPC .. B60G 2202/24; B60G 17/04; B60G 17/056; B60G 17/044; B60G 2500/203; B60G 2500/204; B60G 17/00; F16F 5/00; F16F 9/56; F16F 9/0472; F16F 9/512; F16F 13/007; F16F 2228/066; F16F 2230/18; F16F 9/5123; F16F 9/081;
 (Continued)

(56) References Cited

U.S. PATENT DOCUMENTS 3,487,417 A * 12/1969 Morgan ................ A63B 71/081
 267/64.27
4,991,230 A * 2/1991 Vacanti ................ A63B 71/081
 2/45

(Continued)

FOREIGN PATENT DOCUMENTS

CA 2733991 A1 * 7/2009 ............. A42B 3/122
CN 218651226 U * 3/2023
 (Continued)

OTHER PUBLICATIONS

Baltich et al. "Increased Vertical Impact Forces and Altered Running Mechanics with Softer Midsole Shoes." PLOS ONE | DOI:10.1371/journal.pone.0125196 (Apr. 21, 2015).

(Continued)

*Primary Examiner* — Robert A. Siconolfi
*Assistant Examiner* — Mahbubur Rashid
(74) *Attorney, Agent, or Firm* — Jessica W. Smith; LOZA & LOZA, LLP

(57) ABSTRACT

A wearable and non-wearable shock-absorbing assembly includes an impact-diverting module and a control unit. The impact-diverting module comprises an impact-receiving unit, a valve assembly, an impact-absorbing unit, and fluid-conducting conduits. Both the impact-receiving unit and the impact-absorbing unit comprise at least an outer non-elastic fabric layer and an inner airtight elastic layer. Both the impact-receiving unit and the impact-absorbing unit are filled with a predetermined volume of a fluid, such as air or liquid, to a predetermined pressure. When an external impact is applied to an impact-receiving unit, the fluid is displaced by the force of the impact and flows into the impact-absorbing unit. Upon removal of the external impact from the impact-receiving unit, the displaced fluid flows to the impact-receiving unit from the impact-absorbing unit. The fluid-flow rate may be adjusted by controlling the opening of the valve connecting the impact-receiving unit and the impact-absorbing unit.

20 Claims, 15 Drawing Sheets

(58) Field of Classification Search

CPC ......... F16F 2222/126; F16F 2230/0047; F16F 2230/08; A42B 3/06

See application file for complete search history.

(56) References Cited

U.S. PATENT DOCUMENTS

| | | | | |
|---|---|---|---|---|
| 5,285,877 A * | 2/1994 | Bonenberger | .......... | B60R 19/32 188/266.2 |
| 6,109,400 A * | 8/2000 | Ayyildiz | ................. | B60R 19/40 267/64.26 |
| 6,389,341 B1 * | 5/2002 | Davis | ................... | B60G 21/067 188/274 |
| 7,770,701 B1 * | 8/2010 | Davis | ..................... | H01F 1/447 188/267.1 |
| 7,895,681 B2 * | 3/2011 | Ferrara | ................ | B32B 27/065 2/455 |
| 9,549,585 B2 * | 1/2017 | Amos | ................. | G01C 22/006 |
| 9,795,178 B2 * | 10/2017 | Suddaby | ............... | A42B 3/124 |
| 11,109,632 B2 * | 9/2021 | Suddaby | ............... | A42B 3/121 |
| 11,291,263 B2 * | 4/2022 | Lowe | ...................... | A42B 3/064 |
| 11,969,051 B2 * | 4/2024 | Jacob | ........................ | A61F 5/14 |
| 2003/0009913 A1 * | 1/2003 | Potter | ................. | A43B 13/203 36/28 |
| 2008/0276493 A1 * | 11/2008 | Dunias | ...................... | B62J 1/26 36/35 B |
| 2009/0151203 A1 * | 6/2009 | Boyer | ................... | A43B 7/082 36/3 R |
| 2014/0165427 A1 * | 6/2014 | Molyneux | ............... | A43B 3/34 36/102 |
| 2017/0189786 A1 * | 7/2017 | Riggs | .................... | A42B 3/122 |
| 2018/0008005 A1 * | 1/2018 | Compton | ............... | A43B 13/26 |
| 2018/0132566 A1 * | 5/2018 | Rosenblatt | ............. | A43B 13/20 |
| 2019/0000183 A1 * | 1/2019 | Mou | .................... | A43B 17/035 |
| 2019/0373984 A1 * | 12/2019 | Wijesundara | ........ | A43B 13/206 |
| 2021/0145622 A1 * | 5/2021 | Riffel | ................... | A43B 17/006 |
| 2022/0061447 A1 * | 3/2022 | Kelly | .................... | A42B 3/121 |
| 2022/0192857 A1 * | 6/2022 | Shomoto | ............. | A61H 1/0281 |
| 2024/0415223 A1 * | 12/2024 | Stone | .................... | A42B 3/064 |

FOREIGN PATENT DOCUMENTS

| | | | | |
|---|---|---|---|---|
| CN | 109602570 B | * | 10/2024 | ........ A61G 13/1265 |
| CN | 119157680 A | * | 12/2024 | .......... A61F 5/3753 |
| CN | 119632814 A | * | 3/2025 | |
| KR | 20240114361 A | * | 7/2024 | ............ G16H 40/60 |
| WO | WO-9004932 A1 | * | 5/1990 | ............ A42B 3/122 |
| WO | WO-9108682 A1 | * | 6/1991 | .......... A42B 3/0486 |

OTHER PUBLICATIONS

Kulmala et al. "Running in highly cushioned shoes increases leg stiffness and amplifies impact loading." Scientific Reports 8:17496 (Nov. 30, 2018).

Mez et al. "Clinicopathological Evaluation of Chronic Traumatic Encephalopathy in Players of American Football." J. Am. Med. Assn. JAMA. 318(4):360-370. (2017).

Wang et al. "Expanded Vermiculite-Filled Polyurethane Foam-Core Bionic Composites: Preparation and Thermal, Compression, and Dynamic Cushion Properties." Polymers 2019, 11, 1028; doi:10.3390/polym11061028 (Jun. 11, 2019).

* cited by examiner

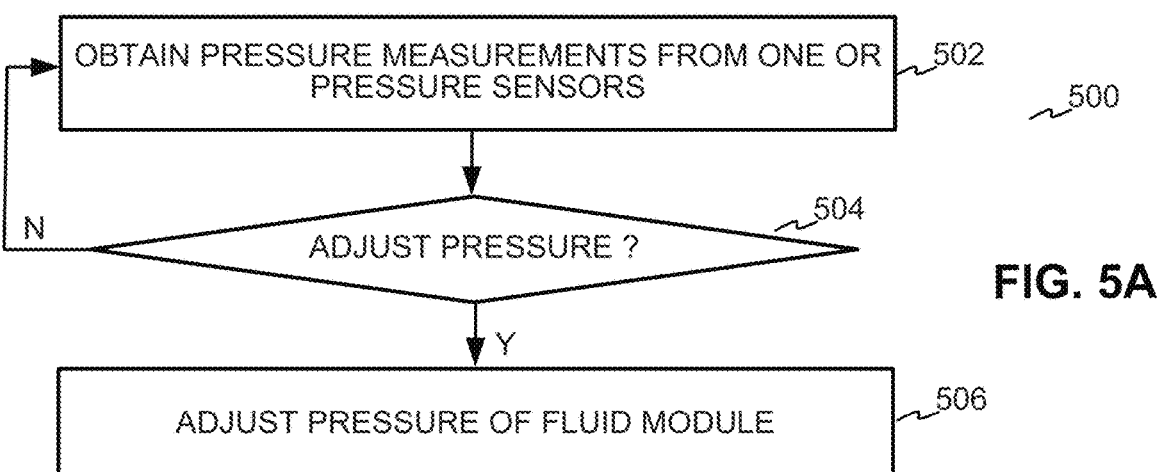

OBTAIN PRESSURE MEASUREMENTS FROM ONE OR PRESSURE SENSORS ⟶502

~500

N

ADJUST PRESSURE ? ⟶504

ADJUST PRESSURE OF FLUID MODULE ⟶506

OBTAIN PRESSURE MEASUREMENTS FROM ONE OR MORE PRESSURE SENSOR DEVICES ⟶512

~510

N

IMPACT DETECTED? ⟶514

Y

DETERMINE ONE OR MORE FLUID MODULES AFFECTED BY IMPACT, E.G., THE IMPACT RECEIVING UNIT ⟶516

FIG. 5B

DETERMINE ONE OR MORE FLUID MODULES TO INCLUDE IN THE IMPACT ABSORBING UNIT ⟶518

OPEN VALVES TO FORM ONE-WAY FLUID FLOW FROM THE IMPACT RECEIVING UNIT TO THE IMPACT ABSORBING UNIT ⟶520

ADD OR REMOVE FLUID TO THE IMPACT RECEIVING UNIT DURING ENERGY DISSIPATION ⟶522

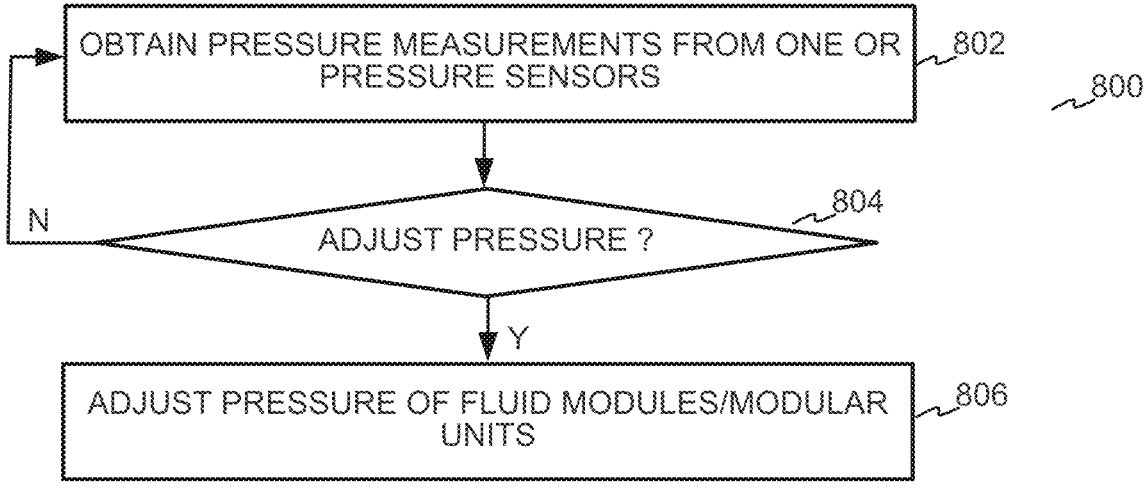

OBTAIN PRESSURE MEASUREMENTS FROM ONE OR
PRESSURE SENSORS ~802

800

N ←—— ADJUST PRESSURE ? ~804

Y ↓

ADJUST PRESSURE OF FLUID MODULES/MODULAR
UNITS ~806

FIG. 8A

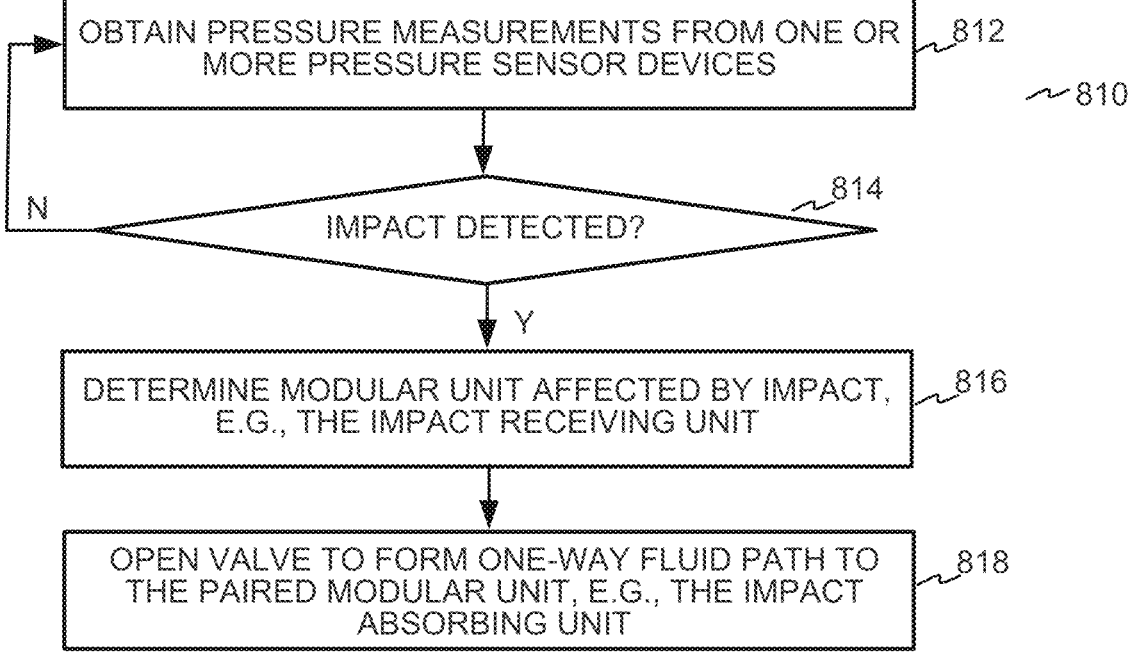

OBTAIN PRESSURE MEASUREMENTS FROM ONE OR
MORE PRESSURE SENSOR DEVICES ~812

810

N ←—— IMPACT DETECTED? ~814

Y ↓

DETERMINE MODULAR UNIT AFFECTED BY IMPACT,
E.G., THE IMPACT RECEIVING UNIT ~816

OPEN VALVE TO FORM ONE-WAY FLUID PATH TO
THE PAIRED MODULAR UNIT, E.G., THE IMPACT
ABSORBING UNIT ~818

FIG. 8B

SHOCK-ABSORBING SYSTEM AND METHOD

FIELD

The present application relates generally to a shock-absorbing system for wearable items and non-wearable items, and more particularly, to a shock-absorbing system, such as in a helmet, shoe, or other wearable item or in a floor or wall or other non-wearable item, having a plurality of impact-diverting modules filled with a fluid.

BACKGROUND

There are many situations where protection against an impact force is not only desirable, but necessary. Impact force is a force that delivers a shock or high impact in a relatively short period of time. It occurs when two objects collide. It can be the result of a person or an object slamming into or falling onto another entity. Such a collision delivers high energy that is ultimately transferred to the impacted object, equipment, and human body, resulting in bodily damage and brain injury that can be enormously costly for the individual and society as a whole. Individuals or objects may be exposed to forceful impacts while performing various activities, such as contact sports, cycling, racing, driving, carpentry, mining, jumping, or other hobbies and professional occupations.

In walking and running, a person's musculoskeletal system, in particular, the lower extremities, the foot, and the spine, is subjected to an enormous amount of shock. At any given moment, the impact force that a person experiences is a sum of potential and kinetic energy, which, without an effective means, will rebound and transmit to the body. In order to reduce the risk of running-related injuries, running shoe manufactures have added cushions to shoe soles aimed at reducing impact loading. The use of cushions is based on the traditional belief that cushions are effective at absorbing the impact force, and thus help to reduce injuring skeletal structures and the joints of the lower extremities and provide comfort to the wearer. Accordingly, modern footwear typically incorporates some form of a cushion, particularly, in the mid sole.

Cushions are commonly made from elastic materials such as air, gel, fibers, springs, and foams. For decades, consumers have been told that cushions in our shoes help to boost comfort and buffer the forces on our bodies that occur during standing, walking, running, and jumping. At present, elastic cushions are the most commonly utilized shock-absorption system. They are used to protect people and objects. Cushions are generally made of air, gel, fibers, springs, and foams. These materials have been used in floor coverings to protect against injuries from falling onto a hard floor. These floor coverings are often found in gymnasiums, schools, recreational areas, and sports arenas. Impact absorbing materials are also used in headgear, footwear, body protectors, and wrapping materials.

However, despite decades of research and development in shoes technology and wide-spread use of cushions, running injuries have not decreased which challenges the effectiveness of shoe cushions. For example, each year between 37% and 56% of runners worldwide incur injuries that typically result from repeated loading of the musculoskeletal system. A recent article demonstrated a surprising finding that ground reaction force impact peak and loading rate were 10.7% and 12.3% greater, respectively, in a maximalist shoe (that is shoes with extra-thick cushion) compared to the conventional shoe. See, Kulmala, J P., Kosonen, J., Nurminen, J. et al., Running in highly cushioned shoes increases leg stiffness and amplifies impact loading. Sci Rep 8, 17496 (2018). https://doi.org/10.1038/s41598-018-35980-6. These counter intuitive findings directly challenge the long-held belief in the protective effects of shoe cushions.

It is common knowledge that many sports, such as American football, rugby, bicycling, hockey, soccer, car race, and basketball are associated with a higher rate of brain concussion. Brain concussions occur when the brain experiences violent motion inside the skull. This usually happens with sudden acceleration or deceleration of the head, e.g., fall to the ground, collision with another player, receiving a tackle or push, getting a hit to the head, head the ball, etc. In all these cases, the brain is twisted and shaken against the skull leading to micro and macro damage to the neural architecture of the white and gray matter of the brain.

Football-related brain concussion problems came to the fore with the publication of a study that showed chronic traumatic encephalopathy (CTE) was found in 99 percent of brains obtained from National Football League (NFL) players, as well as 91 percent of college football players and 21 percent of high school football players. See, Mez J, Daneshvar D H, Kiernan P T, Abdolmohammadi B, Alvarez V E, Huber B R, Alosco M L, Solomon T M, Nowinski C J, McHale L, Cormier K A, Kubilus C A, Martin B M, Murphy L, Baugh C M, Montenigro P H, Chaisson C E, Tripodis Y, Kowall N W, Weuve J, McClean M D, Cantu R C, Goldstein L E, Katz D I, Stern R A, Stein T D, McKee A C. Clinicopathological Evaluation of Chronic Traumatic Encephalopathy in Players of American Football. JAMA. 2017 Jul. 25; 318 (4): 360-370. doi: 10.1001/jama.2017.8334. PMID: 28742910; PMCID: PMC5807097. The findings of the study caused an alarm at the national level and compelled the NFL and other sports organizations to seriously look into this issue.

Since the introduction of modern football helmets in the 1980s, scientific efforts to reduce head injury have been focused almost exclusively on making the helmet stronger and providing a greater amount of padding inside the helmet. Despite the past 35 years of research and development of football helmets, an honest admission by a football helmet manufacturer Guardian Caps is alarming: "Guardian Caps do not reduce or prevent concussions and have never claimed to do so. No helmet, practice apparatus, or helmet pad can prevent or eliminate the risk of concussions or other serious head injuries while playing sports."

The fundamental contributing factor to brain concussion in sports is the existence of a space between the brain and the skull. The brain-skull space is occupied by the dura mater, the arachnoid membrane with cerebrospinal fluid (CSF), and the pia mater, and its distance ranges between 0.4 to 6.7 mm. When a moving person comes to an abrupt stop, the skull stops, but the brain continues to move at the same speed and collides against the skull. This initial collision is followed by cycles of rebounding and collision with the skull until the kinetic energy of the brain is dissipated. The resulting violent collisions between the brain and the skull led to injuries to the neural structures of the brain and, possibly, traumatic encephalopathy.

Thus, there is a need for an improvement to traditional cushioning in helmets to help prevent brain injuries and chronic traumatic encephalopathy (CTE).

SUMMARY

In one or more aspects, a shock-absorbing assembly is implemented on a device and includes at least one impact-diverting module attached to the device. The impact divert-ing module comprises an impact-receiving unit that holds a fluid. When the impact-receiving unit receives an external impact, it forces a displaced volume of the fluid to egress from the impact-receiving unit. The impact diverting mod-ule further comprises an egress fluid conduit that conducts the displaced volume of the fluid from the impact-receiving unit; one or more valves that control an egress flow rate of the displaced volume of the fluid flowing from the impact-receiving unit; and an impact-absorbing unit, wherein the impact-absorbing unit receives the displaced volume of fluid. An ingress fluid conduit conducts the displaced vol-ume of the fluid back to the impact-receiving unit. One or more valves control an ingress flow rate of the displaced volume of fluid into the impact-receiving unit.

In one or more of these aspects, the shock-absorbing assembly further includes a control unit that controls an opening of the one or more valves to regulate the egress flow rate and the ingress flow rate of the displaced volume of the fluid between the impact-receiving unit and the impact-absorbing unit.

In one or more of these aspects, a pressure sensor obtains a pressure measurement for the fluid in the at least one impact-diverting unit, and the control unit increases or decreases a volume of the fluid in the at least one impact-diverting module in response to the pressure measurement.

In one or more of these aspects, the shock-absorbing assembly further includes a pressurized fluid source and/or a fluid pump, and a fluid-conducting line fluidly coupled from the pressurized fluid source or the fluid pump and to the at least one impact-diverting module.

In one or more of these aspects, the at least one valve is a one-way valve that only allows a unidirectional ingress or egress flow of the displaced volume of the fluid.

In one or more of these aspects, the at least one impact-diverting module is a closed, self-contained system without any fluid connections to other impact-diverting modules.

In one or more of these aspects, the impact-receiving unit and the impact-absorbing unit are substantially similar or equal in construction and size.

In one or more of these aspects, the impact-diverting module is pre-loaded with the fluid at a pressure within a range between 5 pounds per square inch (psi) and 50 psi.

In one or more of these aspects, the impact-receiving unit comprises a first plurality of fluid modules that are inter-connected by a first fluid-conducting conduit, and the impact-absorbing unit comprises a second plurality of fluid modules that are interconnected by a second fluid-conduct-ing conduit.

In one or more of these aspects, the control unit further controls the opening of the one or more valves to regulate the ingress flow rate and the egress flow rate of the displaced volume of the fluid between the impact-receiving unit and the impact-absorbing unit, wherein the egress flow rate and the ingress flow rate may be a same flow rate or a different flow rate.

In one or more of these aspects, a position of the impact-receiving unit on the device is different from a position of the impact-absorbing unit on the device such that the exter-nal impact is unlikely to affect both the impact-receiving unit and the impact-absorbing unit.

In one or more of these aspects, a pre-load pressure, density and arrangement of the impact-receiving unit and the impact-absorbing unit on the device are determined by parameters including one or more of: a weight of a user, a height of the user, a level of anticipated impact force, a type of activity, an activity condition, and a personal preference.

In one or more of these aspects, the impact-receiving unit and the impact-absorbing unit comprise at least an outer relatively non-elastic layer and an inner liquid-tight, rela-tively elastic layer.

In one or more of these aspects, the impact-receiving unit and the impact-absorbing unit are configured to be flexible but not elastic, wherein a volume of the impact-receiving unit and the impact-absorbing unit are fixed, and wherein a pressure of the impact-receiving member and the impact-absorbing member is variable in proportion to a volume of the fluid.

In one or more of these aspects, an outer layer of the impact-receiving unit and an outer layer of the impact-absorbing unit comprise one or more of: graphite fibers, nylon fibers, ceramic fibers, polyethylene fibers, glass fibers, or aramid or polyaramid poly (phenylene diamine tereph-thalamide) fabric.

In one or more of these aspects, an inner layer of the impact-receiving unit and an inner layer of the impact-absorbing unit comprise one or more of: rubber, silicone, thermoplastic polyurethane, or neoprene.

In one or more of these aspects, the one or more valves include at least one of: a plug-type valve, ball-type valve, or butterfly-type valve, and wherein a plurality of the valves are organized to form a modular monoblock.

In one or more of these aspects, the device comprises a wearable device, including at least one of: a helmet, a shoe, protective body gear, elbow pad or knee pad.

In one or more of these aspects, the device comprises a non-wearable device, including at least one of: a wall, a floor, or a container.

In one or more of these aspects, the device comprises a helmet, wherein the at least one impact-diverting module is attached to at least one of: an internal surface of the helmet, an external surface of the helmet, or both the internal surface and external surface of the helmet.

BRIEF DESCRIPTION OF THE DRAWINGS

FIGS. 5A-C illustrate flow charts of exemplary methods of the shock absorbing system.

FIGS. 8A-C illustrate flow charts of exemplary methods of the shock absorbing system.

DETAILED DESCRIPTION

Figure 1A:
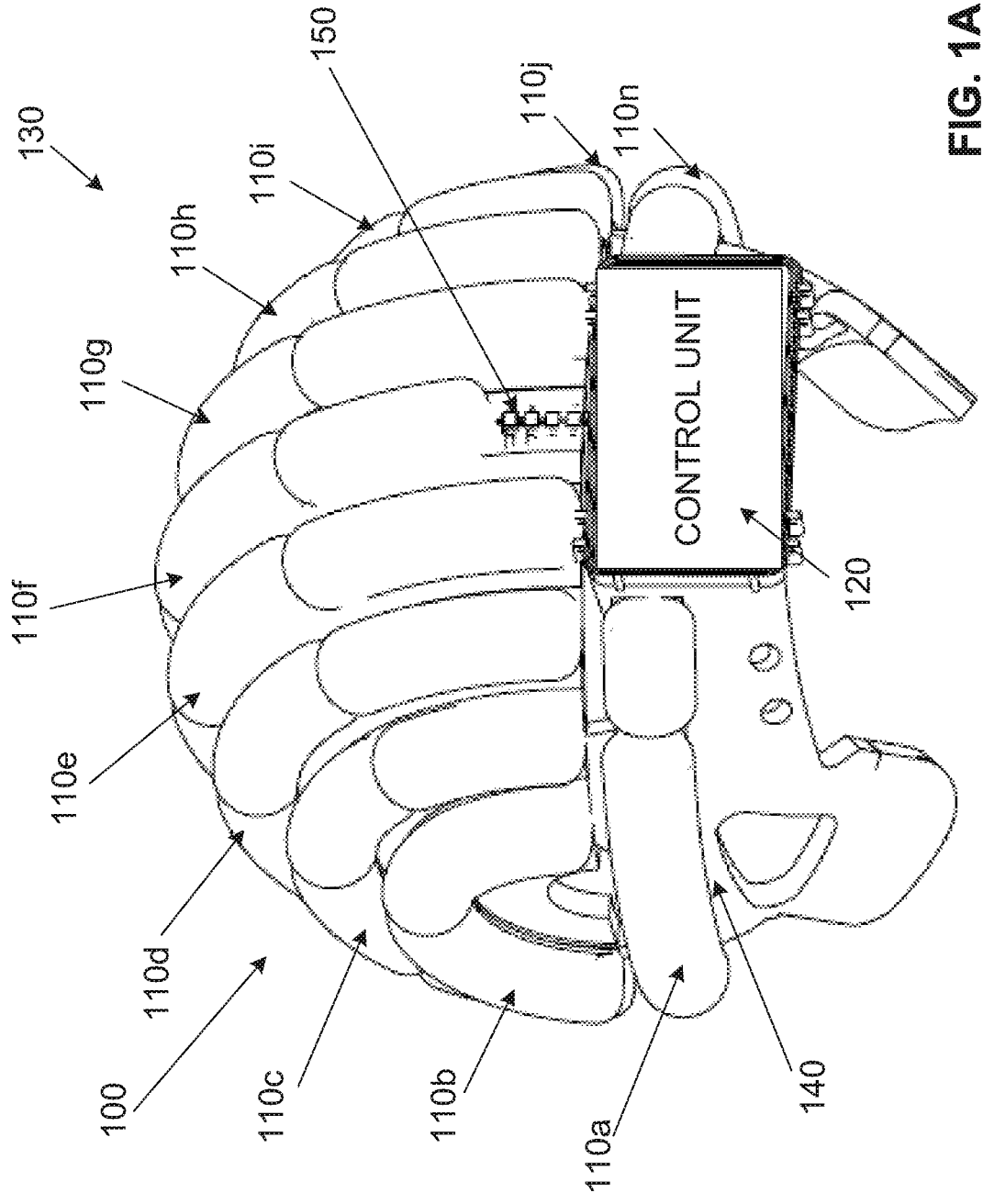
FIG. 1A illustrates a perspective view of an embodiment of a helmet including a shock-absorbing assembly.

The word "exemplary" or "embodiment" is used herein to mean "serving as an example, instance, or illustration." Any implementation or aspect described herein as "exemplary" or as an "embodiment" is not necessarily to be construed as preferred or advantageous over other aspects of the disclosure. Likewise, the term "aspects" does not require that all aspects of the disclosure include the discussed feature, advantage, or mode of operation.

Embodiments will now be described in detail with reference to the accompanying drawings. In the following description, numerous specific details are set forth in order to provide a thorough understanding of the aspects described herein. It will be apparent, however, to one skilled in the art, that these and other aspects may be practiced without some or all of these specific details. In addition, well known steps in a method of a process may be omitted from flow diagrams presented herein in order not to obscure the aspects of the disclosure. Similarly, well known components in a device may be omitted from figures and descriptions thereof presented herein in order not to obscure the aspects of the disclosure.

Helmets are a critical piece of protective equipment used to reduce the risk of head injuries, including concussions, skull fractures, and other traumatic brain injuries. Helmets are designed to protect the head by absorbing and dissipating the energy from impacts, thereby reducing the force transmitted to the skull and brain. This is achieved through a combination of materials and structural design. For example, in general, current helmets include a hard outer shell and inner padding or cushioning. The hard outer shell is generally made from durable materials like polycarbonate or ABS plastic and is designed to absorb and distribute impact forces across the surface of the helmet, reducing the force concentrated on any single point. The inner cushioning includes, e.g., expanded polystyrene (EPS) foam and functions to cushion the head and absorbs shock from impacts. Some helmets use multiple layers of foam with different densities that can manage different types of impact. For example, softer foams can absorb lower-energy impacts, while harder foams can handle higher-energy impacts. This layered approach allows the helmet to provide protection across a range of impact forces. Helmets may also include a face mask attached to the front to protect the face from direct impacts and/or a chin strap to secure the helmet to a wearer's head.

The material and structure of these current helmets work through energy absorption and dissipation. When an impact occurs, the outer shell spreads the force over a larger area, while the inner padding compresses to absorb the kinetic energy of the moving head. This reduces the peak force experienced by the head. The materials in the helmet are designed to deform or crush in a controlled manner, converting the kinetic energy into other forms of energy (like heat) through the deformation process.

The past research and development efforts to surmount the brain concussion epidemics have been generally focused on making the helmet shell stronger or providing a greater amount of padding inside and outside of the helmet. These efforts while laudable disregard the principal cause of brain concussion: the continued movement of the brain against the abruptly-stopped skull. At the moment of impact, the player's head, thus the skull, comes to an abrupt stop, but the brain continues to travel with attendant linear and angular acceleration and collides into the stationary skull bone. As stated before, this fierce twisting, smashing, and jolting movement is the root cause of brain concussion. Without an effective shock-absorbing system, brain concussion is the unfortunate, yet, expected outcome. The difficulty can be easily solved if there is a way to eliminate the space between the brain and the skull, in which case the brain will be locked in and cannot jolt or twist inside the skull, but this is impossible.

Despite decades of concerted scientific endeavors, developing an effective means to reduce the shock imparted to a person's body or an object has been surprisingly elusive. The consensus of the experts in the field of wearable and non-wearable shock-absorption system is that the present technology is very much wanting. The present invention offers a wearable and non-wearable impact-absorbing assembly that effectively absorbs kinetic energy.

Mechanical energy of an object is a measure of its ability to perform work and is the sum of its kinetic energy and potential energy. Mechanical energy is derived from the object's motion and position in a gravitational field. The total mechanical energy of an object can be described by the equation:

$$\text{Total mechanical energy} = \text{Kinetic energy} + \text{potential energy.}$$

More explicitly stated:

$$\text{Total mechanical energy} = \tfrac{1}{2}m*v2 + m*g*h$$

where,
m is mass of an object,
v is velocity of that object,
g is acceleration due to gravity, and
h is height of an object.

There are two types of potential energy: gravitational potential energy and elastic potential energy. Gravitational potential energy is the energy an object possesses when it rises to a specific height against gravity. Its gravitational potential energy is equal to the amount of work needed to raise the object against gravity to a height, and it can be expressed as:

$$W = m*g*h$$

where,
m is the mass of the object,
g is the acceleration due to gravity,
h is the height at which the object has been raised from the ground.

Elastic potential energy is the energy contained in compressible or stretchable items such as foams, springs, elastic bands, trampolines, and bungee cords, and is derived from the energy needed to bend, contract, and stretch intra- and inter-molecular bonding forces. Elastic potential energy can be represented as:

$$U = \tfrac{1}{2}*k*x^2$$

where,
k is the constant force needed to stretch or compress an elastic object (i.e. the stiffness k), and
x is the displacement, e.g., the length of the stretch or compression These fundamental principles of physics are now applied to explain the process that occurs during an impact. Let's take a person who is fitted with a pair of jump shoes and stands on one foot at a time. Just before the person steps on one jump shoe, the person possesses gravitational potential energy that is calculated using the formula W=m*g*h. Once the person transfers the full weight upon the jump shoe, a part of the person's gravitational potential energy is transferred to the jump shoe, in the form of potential energy. The jump shoe instantaneously redirects its force (the rebound force) upon the sole. In the end, the force experienced by the sole (also known as ground reaction force (GRF)) can be represented as:

$$GRF = m*g + f_{spring}.$$

where, m is the mass of the object, g is the acceleration due to gravity, $f_{spring}$ is the rebound force of the sole.

The force experienced by the sole GRF is greater by $f_{spring}$ than if the person stepped onto a bare floor. This paradox can be easily explained. In the beginning, the force on the sole of the person is the spring force of the jump shoes. The force of the jump shoes, according to Hooke's law, $f_{sole} = k*x$, is proportional to the length of compression x, and in the beginning, with a low x value, the $f_{sole}$ is very low. As a result, the person was able to compress the jump shoes with ease. As the distance of compression increases, so does the force $f_{sole}$, until the jump shoes could no longer be compressed. At that point, the $f_{sole}$ equals $m*g + f_{spring}$.

The force dynamics observed when stepping on a spring is no different when the spring is substituted by any other elastic cushions such as foams, rubber, air, gel, springs, and fabrics. The fundamental reason for this paradoxical increase in GRF with cushions is due to their ability to absorb the impact forces and immediately redirect them to any objects that are in contact. The absorbed impact force by the cushion, as long as the person remains in contact with the cushion, will return to the person, which represents the additional force experienced by the sole of the person.

What about the force experienced by the floor? Based on Newton's 3rd law of motion, the force experienced by the floor has to equal the same GRF. This point is vitally important because the human body, whether it be the trunk or the head, is usually situated interior to a protective means such as cushions. From the above discussion, it should be abundantly clear that any and all methods and systems that utilize elastic cushions (foams, rubber, air, gel, springs, fabrics) as the impact-absorbing means, not only fail to reduce, but actually magnify, impact forces experienced by the person's body.

This phenomenon was aptly demonstrated in a study, entitled, "Increased Vertical Impact Forces and Altered Running Mechanics with Softer Midsole Shoes," Baltich J, Maurer C, Nigg B M (2015), PLOS ONE 10 (4): e0125196. https://doi.org/10.1371/journal.pone.0125196. In the study, they showed an increase in GRF when the participants ran with cushioned shoes compared to those who ran with shoes with less amount of or no cushions. Since the transmitted force, according to Newton's 3rd law of motion, is equal to GRF, this study suggests that an increased thickness of cushion results in increased transmitted force to a person or an object located on the opposite side of the applied force. The implication of this study for a head helmet with foam cushions is that the impact force encountered by a person's head is actually greater, not less, than the original impact force. All elastic shock-absorbing systems that exist today, therefore, fail to achieve their purported goal.

In addition to its lack of shock-reducing ability, easily compressible cushions have other crucial weaknesses. Foam cushions due to their material property and construction have a low impact resistance, offer very little protection. This is well illustrated by the study: Wang, H.; Li, T.-T.; Ren, H.; Peng, H.; Huang, S.-Y.; Lin, Q.; Lin, J.-H.; Lou, C.-W. Expanded Vermiculite-Filled Polyurethane Foam-Core Bionic Composites: Preparation and Thermal, Compression, and Dynamic Cushion Properties. Polymers 2019, 11, 1028. The study shows that the maximum compression of a 26 mm-thick polyurethane foam occurs only after 14 milliseconds after dropping an 8 kg object. If a player while wearing a foam-cushioned helmet is tackled by another player (whose mass may be 10 times 8 kg weight), the full impact force will be felt by the impacted player well before 14 milliseconds of collision at which point his head will come to an abrupt stop. The brain, however, continues to travel at the same speed to ultimately collide into the skull.

From the above discussion, the ineffectiveness of cushions as a shock-absorbing apparatus is obvious. Embodiments described herein improve on these known cushion-based approaches. More specifically, a shock-absorbing assembly is described herein that diverts an impact force away from the impact site so that the user or object can be spared from the majority of the impact force.

The present shock-absorbing assembly can be understood by considering the impact force formula:

$$F_{impact} = m*v/(2t)$$

where, $F_{impact}$ is the impact force, m is the mass of the body, v is the velocity of the body, and t is the time taken.

The formula implies that the impact force experienced by the impacted object is inversely related to the impact time. According to the formula, then, for the same mass and velocity, when the impact time is short, the force experienced by the impacted object is higher than when the impact time is longer. For example, when the impact time is short, the force is high because the impacting object has little time to slow down. On the other hand, a longer impact time lessens the force, because the impacting object has more time to slow down such that the velocity at impact will be considerably slower. With a slower velocity, the imparted energy will be proportionally lower. The embodiments described herein are designed to increase the impact time t to ultimately reduce the impact force $F_{impact}$ imparted to the impacted target. During the increased impact time, the brain has more time to slow down and come to a gentle stop without jolting or twisting inside the skull. The shock-absorbing assembly described herein thus offers diverse sports players unprecedented benefits of reduction in the risk of brain concussion.

The present shock-absorbing assembly may be incorporated into diverse wearable devices, including headgear, body protectors, footwear, elbow pads, knee pads, etc. When worn, the shock-absorbing assembly includes the following general characteristics:

1. Must be light.
2. Must be of limited bulkiness.
3. Must be durable.
4. Must be comfortable to wear.
5. Must be safe.
6. Must be easy to operate and maintain.
7. Must be affordable.
8. Must be easy to manufacture.
9. Must be effective.
10. Must be adjustable on demand.

The present shock-absorbing assembly, furthermore, may also be incorporated into other types of devices, such as wrapping materials used to protect objects during transportation and storage. The shock-absorbing assembly may be incorporated into walls, floors, ceilings, etc. It is applicable in areas such as personal, athletic, industrial, and military. The advantages of the shock-absorbing assembly will now be described in more detail.

Overview

The wearable and non-wearable shock-absorbing assembly effectively diverts an impact force away from the impact site so that the impact force is not experienced by the user or object. It comprises an impact-diverting module and an electronic controller. The impact-diverting module comprises an impact-receiving unit, a valve assembly, an impact-absorbing unit, and fluid-conducting conduits. In one embodiment, both the impact-receiving unit and the impact-absorbing unit comprise at least an outer, relatively non-elastic fabric layer and an inner fluid tight, relatively elastic layer. Both the impact-receiving unit and the impact-absorbing unit, furthermore, are filled with a predetermined volume of a fluid, such as air or liquid, so as to reach a predetermined pressure. The impact-receiving unit and the impact-absorbing unit connect through the valve assembly using the fluid-conducting conduits to create a self-contained, air-tight module. In practice, when an external impact is applied to an impact-receiving unit, the fluid contained in the same is displaced by the force of the impact and flows into the impact-absorbing unit. Once the impact is removed from the impact-receiving unit, the displaced fluid will return to the impact-receiving unit. The impact-receiving unit and the impact-absorbing unit are positioned far enough apart such that they would be unlikely to be in the same area of an impact. The fluid-flowing rate may be adjustably set by controlling an opening of a valve in the valve assembly connecting the impact-receiving unit and the impact-absorbing unit.

EMBODIMENTS

Figure 1B:
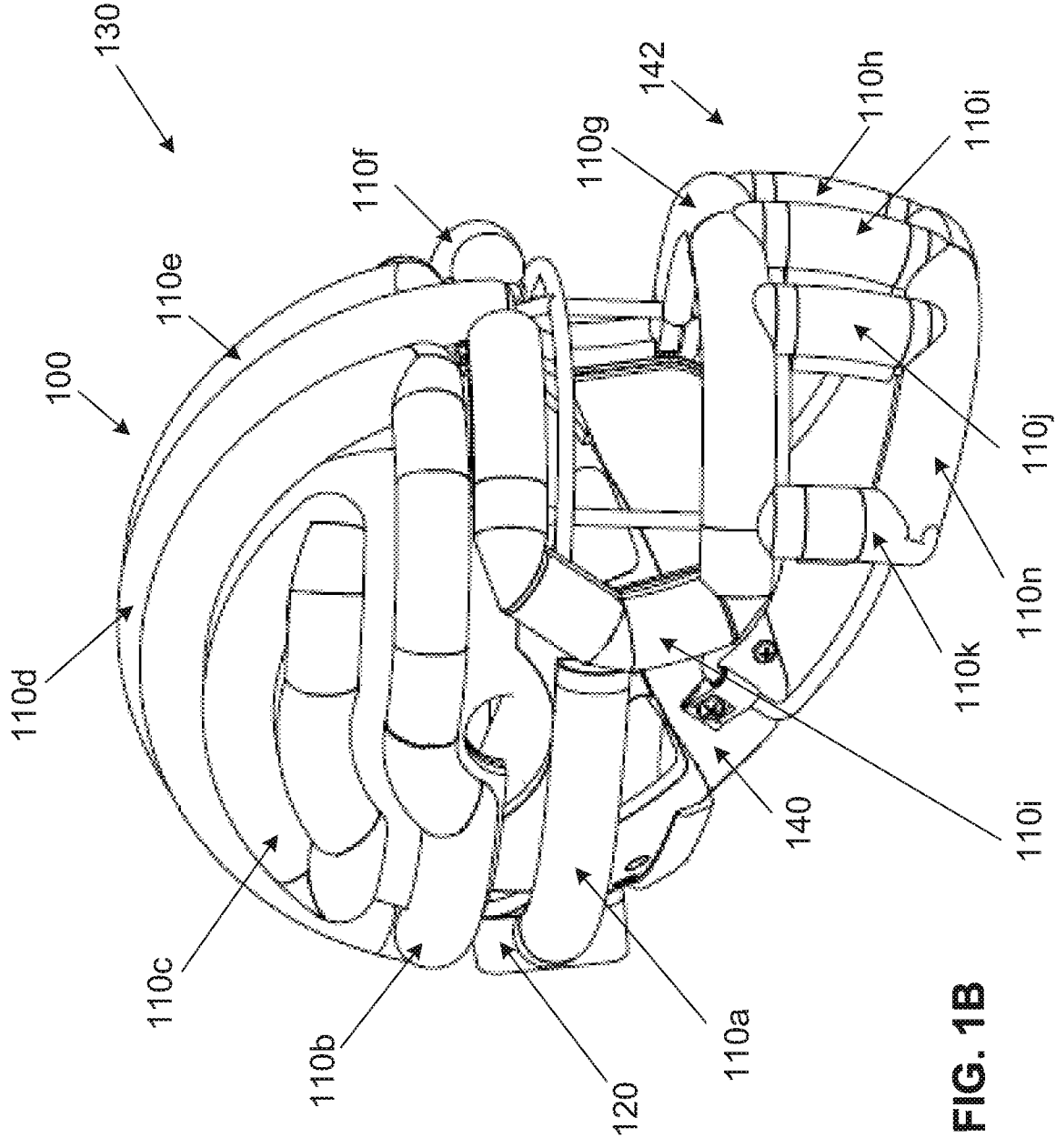
FIG. 1B illustrates a perspective view of another embodi-ment of a helmet including the shock-absorbing assembly.

FIGS. 1A and 1B illustrate a perspective view of an embodiments of a helmet 130 including the wearable and non-wearable shock-absorbing assembly 100. As shown in FIG. 1A, the helmet 130 is configured to fit over a head of the wearer and includes a skeleton 140. The skeleton 140 is shaped similar to a dome or partial sphere configured to cover the skull. The skeleton 140 is preferably a rigid material, such as a metal or hard plastic structure. A plurality of fluid modules 110a-n are secured on an external surface of the skeleton 140 of the helmet 130, and preferably on a majority of the external surface of the skeleton 140 of the helmet 130. The plurality of fluid modules 110a-n are coupled by fluid conducting conduits and a valve assembly 150 that is controlled by a control unit 120.

In FIG. 1B, the exemplary helmet 130 includes a face mask 142 configured to fit over the face of the wearer. The helmet 130 and face mask 142 both include the plurality of fluid modules 110a-n on a majority of an external surface of the helmet 130. The size, density and arrangement of the fluid modules 110a-n on the external surface of the helmet 130 may be variable and may be determined using parameters such as the weight and height of the user, the level of anticipated impact, the type of activity, the activity condition, personal preference, etc. For example, a helmet 130 designed for football may include large fluid modules 110a-n that are less densely packed in contrast to a helmet designed for a fencer that may include smaller fluid modules 110a-n that are very densely packeted. The fluid modules 110a-n may be substantially similar or equal in construction, shape and size or may vary in construction, size and shape, e.g., depending on their position on a helmet 130 or type of helmet 130.

Figure 1C:
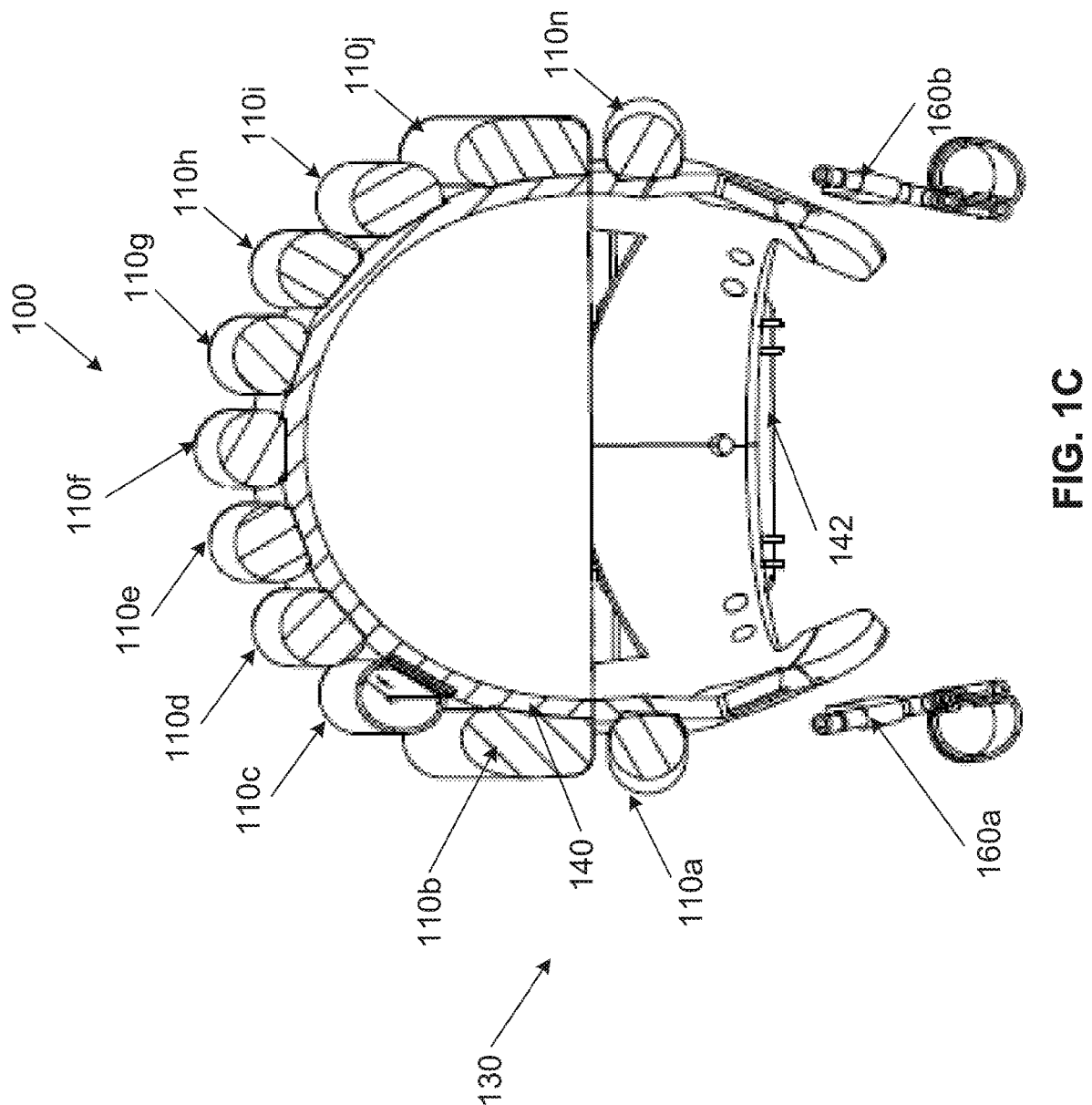
FIG. 1C illustrates a perspective view of an additional embodiment of the helmet including the shock-absorbing assembly.
Figure 1D:
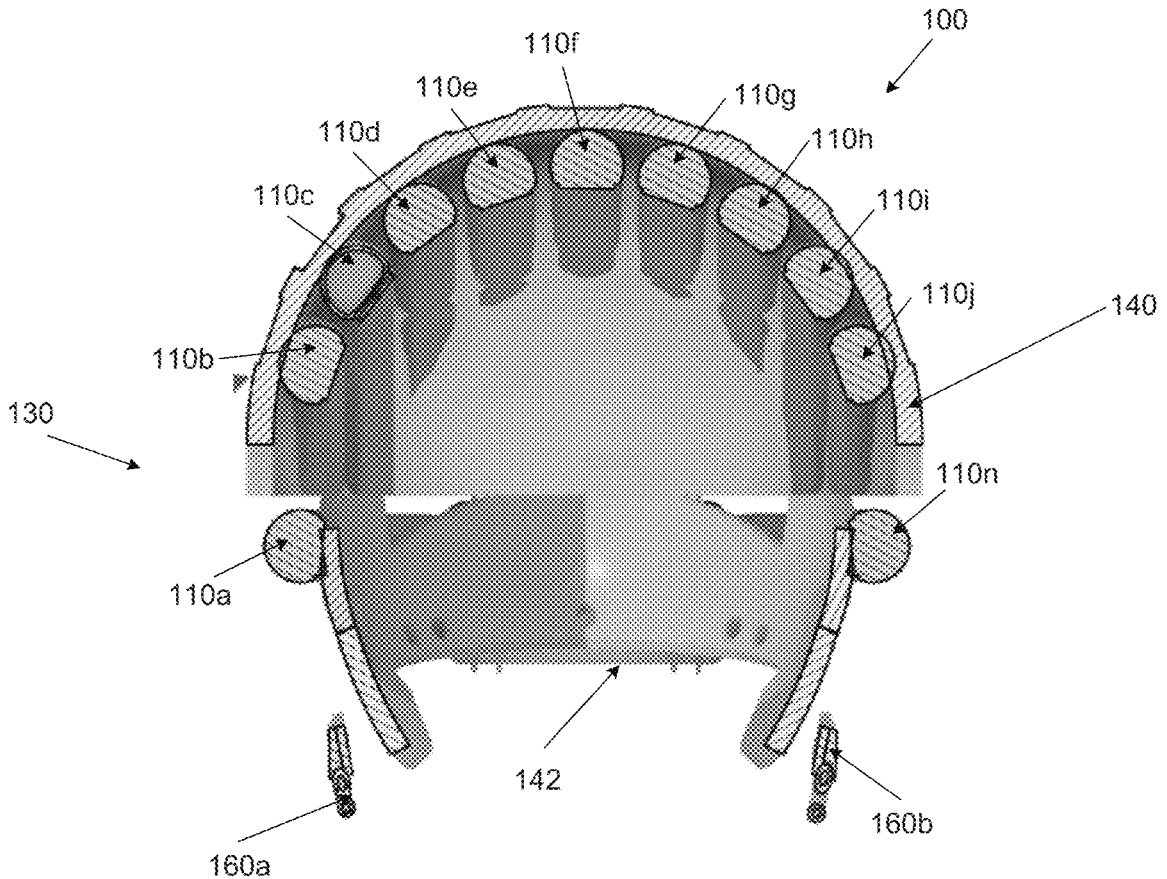
FIG. 1D illustrates a perspective view of an additional embodiment of the helmet including the shock-absorbing assembly.

FIGS. 1C and 1D illustrate perspective views of additional embodiments of the helmet 130 including the shock-absorbing assembly 100. In FIG. 1C, the plurality of fluid modules 110a-n in the shock-absorbing assembly 100 are attached to an external surface of the rigid helmet skeleton 140, as well as an external surface of the face mask 142, e.g., using an adhesive, welding of the materials together, fasteners such as screws, or other attachment means. The fluid modules 110a-n may be covered fully or partially by an external covering (not shown), such as a fabric, a plastic or a metallic layer. Chin straps 160a-b may be incorporated in the helmet 130 as well.

In FIG. 1D, the plurality of fluid modules 110a-n of the shock-absorbing assembly 100 are attached to an internal surface of the rigid helmet skeleton 140, e.g., using an adhesive, welding of the materials together, fasteners such as screws, or other attachment means. For comfort of the wearer, the fluid modules 110a-n may be covered fully or partially by an internal covering and/or padding (not shown), such as foam, quilted pads, a fabric, or soft plastic, which lays between a wearer's head and the fluid modules 110a-n. In other embodiments, the fluid modules 110a-n are located on both an internal surface and an external surface of the helmet skeleton 140. In addition, in other embodiments, the fluid modules 110a-n are located on the internal surface of the face mask 142 or on both the internal and external surfaces of the face mask 142.

Figure 2:
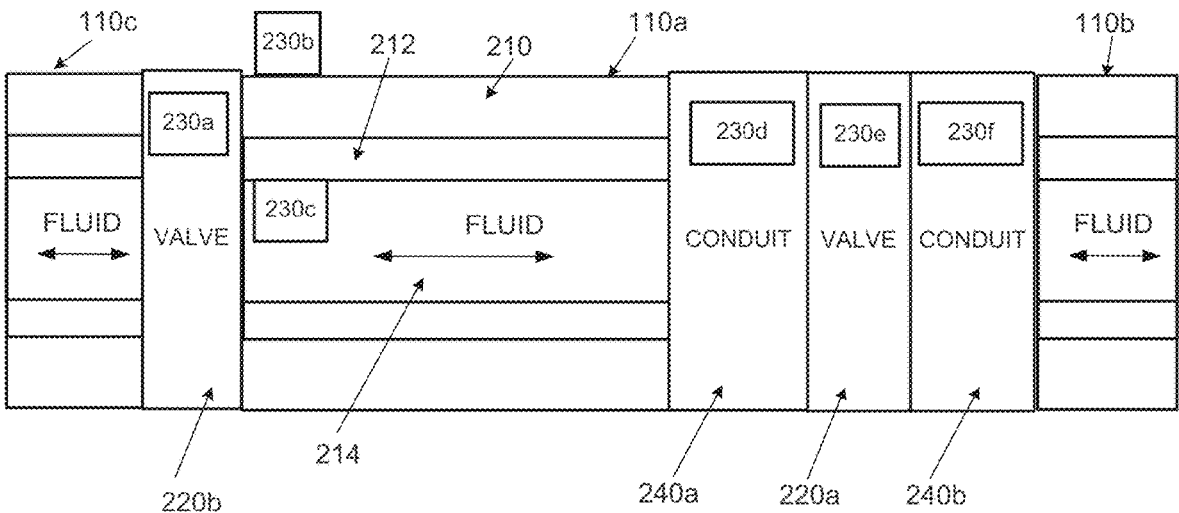
FIG. 2 illustrates a schematic block diagram of an embodiment of a plurality of fluid modules in the shock-absorbing assembly.

FIG. 2 illustrates a schematic block diagram of an embodiment of the plurality of fluid modules 110a-c. An outer layer 210 of the fluid modules 110a-c is configured to hold the shape of the fluid module 110a-c so the outer layer does not absorb the impact force and comprises one or more relatively non-elastic, high tensile strength, penetration-resistant materials, such as graphite fibers, nylon fibers, ceramic fibers, polyethylene fibers, glass fibers, layers of aramid or polyaramid poly (phenylene diamine terephthalamide) fabrics (sold by DuPont under the registered name of Kevlar®), etc. The flexible nature of these materials is important for their collapsibility. The relatively inelastic characteristic of these materials render them non-stretchable so that there is no possibility of the outer wall 210 absorbing an impact force. Such un-diverted impact energy will make the system less effective. An inner layer 212 of the fluid modules 110a-c is made from one or more relatively elastic, fluid tight materials such as silicone, rubber, thermoplastic polyurethane, neoprene, etc. The inner layer 212 forms an inner conduit 214 that holds fluid, such as a gas, a liquid, a mixture of gases, a mixture of liquids or a mixture of gases and liquids. The inner conduit 214 is cylindrically shaped with a length greater than its diameter. The outer layer 210 may also by cylindrically shaped but may form a different external shape, e.g., such as a dome with a flattened lower portion that adheres to the helmet 130.

In one embodiment, a first fluid module 110a is fluidly coupled to a second fluid module 110b using at least a first conduit 240a that connects to a first valve 220a in the valve assembly 150. The first valve 220a is fluidly connected to a second fluid conduit 240b that fluidly connects to the second fluid module 110b. In another embodiment, a second valve 220b may fluidly connect the fluid module 110a to a third fluid module 110*c*, e.g., without flowing through a valve assembly 150. Thus, each of the fluid modules 110*a-n* is coupled to at least one other fluid conduit 110*a-n* via a valve 220*a-n*.

While there are many types of fluid-flow control valves, such as plug-type, ball-type, or butterfly-type, ball valves are preferred due to their ease of use in both the fitting and its maintenance. A ball valve assembly comprises a body, seats, pivoting ball, and a stem, and a housing. A pivoting ball is designed with a bore in the center. A stem on top of the pivoting ball helps to turn the pivoting ball. This action results in opening or closing of the valve, thereby controlling the rate of fluid flow. The fluid flow rate is maximum when the hole is completely aligned with the inlet and outlet opening. The flow stops when the axis of the hole is at 90 degrees to the axis of the inlet and outlet opening. The intermediate flow rate may be selected by setting the pivoting ball between these two extremes. A pivoting ball is held into the valve body by two identical seat seals that help to ensure fluid sealing. Disposed on either side of the valve body is a fluid passage and a coupling member to accept an egressing or ingressing fluid flow conduit. The ingress and egress flow rate may be set separately.

One or more pressure sensors 230*a-f* are positioned in the shock absorbing assembly 100 to detect the pressure at the outer wall 210 and/or in the inner conduit 214 and/or at the valves 220*a-b* or in the conduits 240*a-b* between fluid modules 110*a-c*. The electronic control unit 120 comprises one or more fluid pressure regulators that regulate the pressure of the fluid in the fluid modules 110*a-n*. For example, when the fluid includes air, the pressure regulator adjusts a volume of air in the fluid modules 110*a-n* using one or more fluid pumps, air-inflating units, pressurized air sources, etc.

Figure 3:
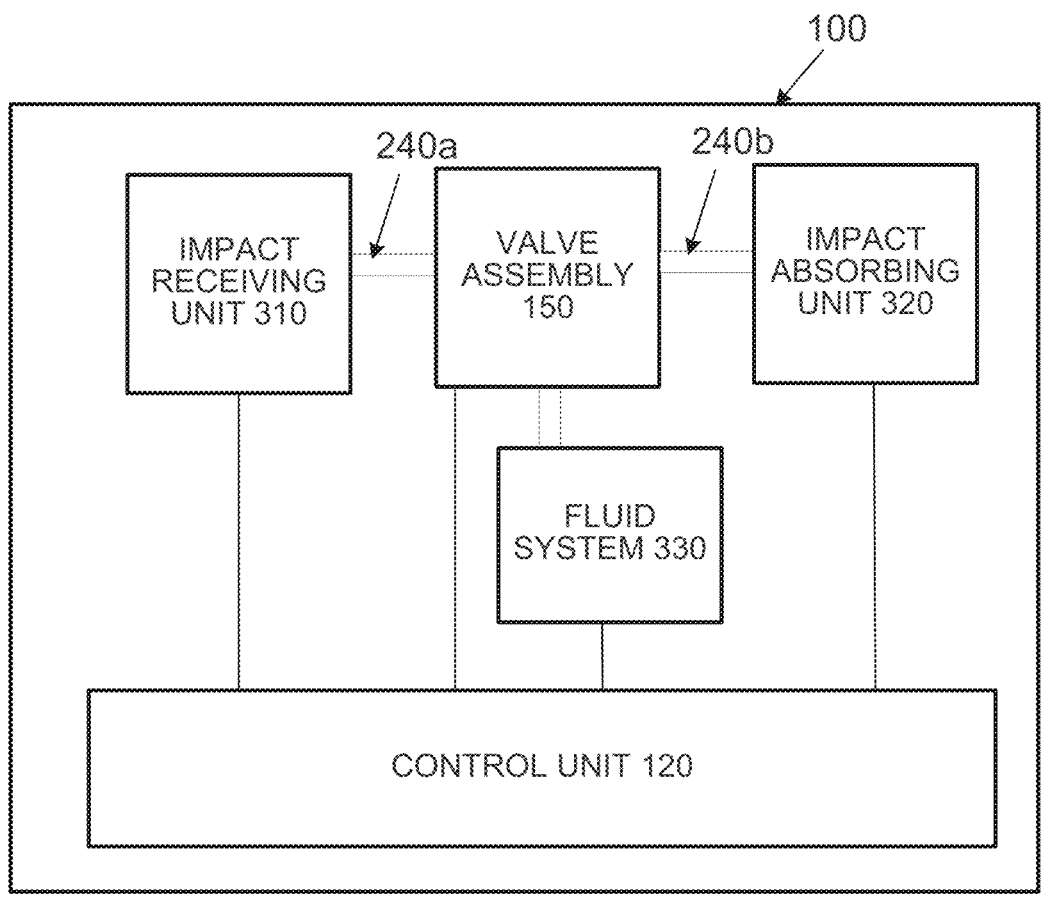
FIG. 3 illustrates a schematic block diagram of an embodiment of the shock absorbing assembly.

FIG. 3 illustrates a schematic block diagram of an embodiment of the shock absorbing assembly 100. In use, one or more of the pressure sensors 230 measures an increase in pressure indicative of an impact affecting one or more fluid modules 110*a-n*. The impacted fluid modules 110*a-n* are called the "impact receiving unit" 310 in FIG. 3. The control unit 120 receives the sensor readings and determines that an impact has occurred in the impact receiving unit 310. The control unit 120 determines an "impact absorbing unit" 320 that includes one or more other fluid modules 110*a-n* not within the impact zone. For example, when the impact occurs at a front of the helmet 130, the impact absorbing unit 320 may be designated at a back or side of the helmet 130. The control unit 120 then signals one or more valves 220 in the valve assembly 150 to open and form a one way path for fluid to flow from the impact receiving unit 310 to the impact absorbing unit 320.

The fluid system 330 comprises a fluid pump and/or a pressurized fluid source and a plurality of fluid lines wherein each fluid line is connected to one or more of the fluid modules 110*a-n*. The control unit 120 uses the fluid system 330 and valve assembly 150 to control the pressure in the fluid modules 110*a-n* and regulate fluid flow from the impact receiving unit 310 to the impact absorbing unit 320. The distance between an impact-receiving unit 310 and an impact-absorbing unit 320 should be sufficiently large so the units are not likely to be in the same field of an impact. For example, an impact-receiving unit 310 located on the left side of the head may be paired with an impact-absorbing unit 320 located on the right side of the head. Or an impact-receiving unit 310 located at the front of the head may be paired with an impact-absorbing unit 320 located at the back of the head. In practice, when an impact is directed to the right side of the head, the ipsilateral impact-receiving unit 310 will receive the force of the impact, and the paired impact-absorbing unit 320 that is located in the contralateral side will receive the displaced energy from the impact-receiving unit 310. Since the impact force is diverted away, the person or the object will not experience the full impact force. Both the impact-receiving unit 310 and the impact-absorbing unit 320 are configured to be flexible but not elastic, wherein a volume of the impact-receiving unit 310 and the impact-absorbing unit 320 are fixed, and wherein a pressure of the impact-receiving unit 310 and the impact-absorbing unit 320 is variable in proportion to a volume of the fluid.

The valves 220 in the valve assembly 150 are reversibly joined to form a conjoint valve assembly or a modular mono-block. This configuration permits adjusting the fluid-flow rate of fluid ingressing to and/or egressing from the fluid modules 110*a-n* in one simple step. It may be desirable to set the fluid-flow rate based on various parameters such as the expected impact level, the weight or the height of the user, the type of activity, etc.

The fluid flow from an impact-receiving unit 310 to an impact-absorbing unit 320 is called "egressing" and the fluid returning from an impact-absorbing unit 320 to the impact-receiving unit 310 is called "ingressing". Both the fluid egressing and ingressing processes are driven by pressure differentials between the impact-receiving unit 310 and the impact-absorbing unit 320 and continue until a pressure equilibrium is achieved. At the end of the fluid egressing phase, e.g., after absorption of the impact force, the direction of fluid flow will reverse, initiating a fluid ingressing phase. In one embodiment, the valve assembly 150 is used to restrict the flow of fluid in only one direction at a time (either ingressing or egressing). In another embodiment, two conduits are used to connect the impact-receiving unit 310 and impact-absorbing unit 320 with each conduit including a one-way valve so that the flow of the fluid is unidirectional. In this embodiment, because of the separate egressing and ingressing systems and the valve assembly 150, the two processes cannot occur simultaneously.

Figure 4:
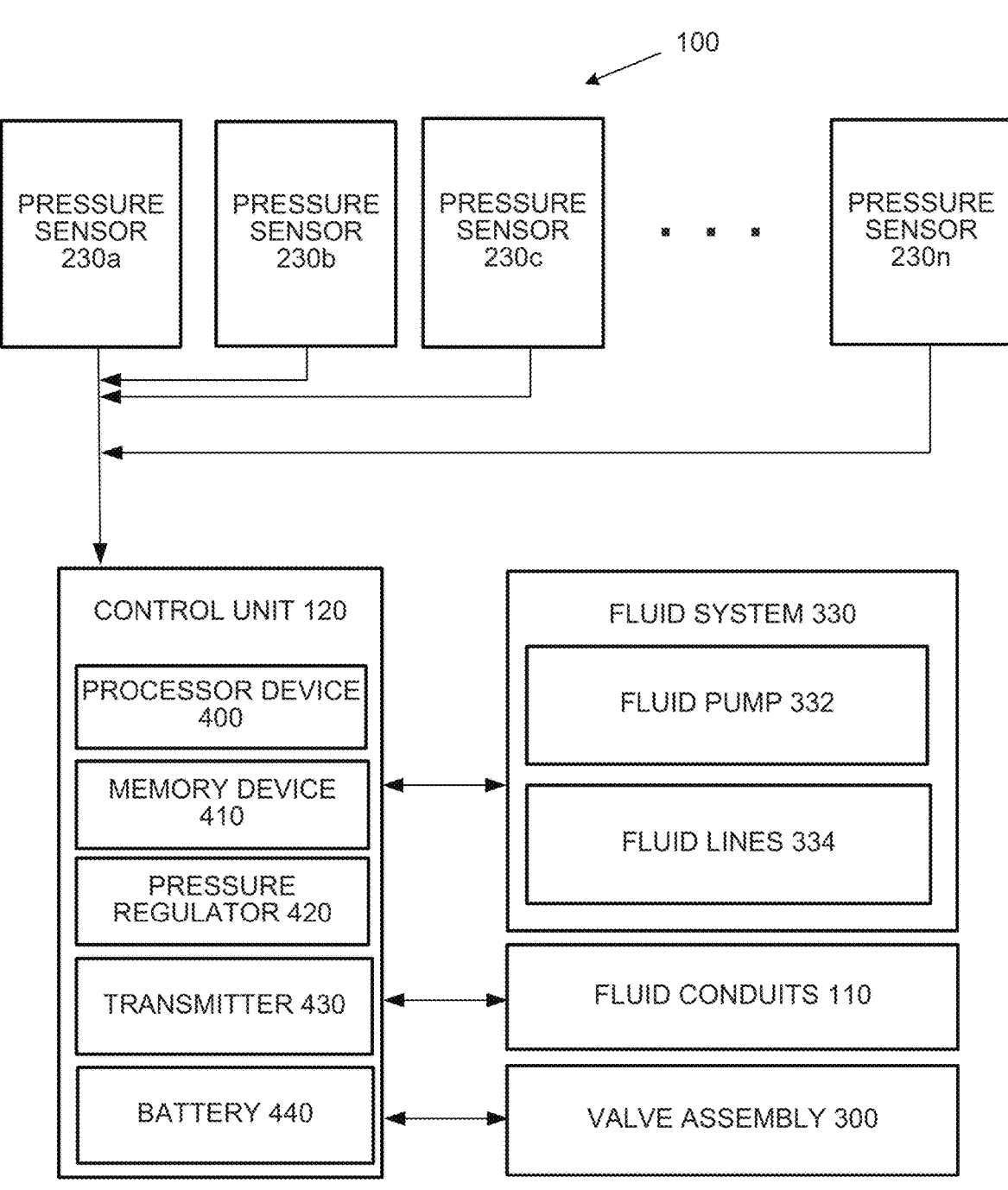
FIG. 4 illustrates a schematic block diagram of an embodiment of the shock absorbing assembly in more detail.

FIG. 4 illustrates a schematic block diagram of an embodiment of the shock absorbing assembly 100 in more detail. The control unit 120 includes a processor device 400 and a memory device 410. The memory device 410 includes one or more non-transitory processor readable memories that store instructions which when executed by the processor device 408, causes the shock absorbing assembly 100 to perform one or more functions described herein. The processor device 400 includes at least one processor, such as a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The memory device 410 includes a non-transitory memory device and may be an internal memory or an external memory, and may be a single memory device or a plurality of memory devices. The memory device 410 may be a read-only memory, random access memory, volatile memory, non-volatile memory, static memory, dynamic memory, flash memory, cache memory, and/or any non-transitory memory device that stores digital information.

The control unit 120 may include a separate pressure regulator 420 or it may be integrated with the processor device 400 or a separate pressure regulator 420 may be located separately in a different device or encasement. The control unit 120 may further include a wireless transmitter 430 and battery 440.

The control unit 120 adjusts a volume of fluid in the fluid modules 110 in response to measurements from the plurality of pressure sensors 230a-n, wherein the sensors 230a-n measure the pressure of the fluid modules 110a-n. A fluid system 330 includes one or more fluid pumps 332 that pump fluids through fluid lines 334 into the fluid modules 110a-n or valve assembly 150. With the present device, while the entire energy transfer can be successfully achieved spontaneously, it may be further fine-tuned through manual and/or electronic control means using solenoids to open and close the valves 220. The control unit 120 monitors the pressure of the shock absorbing system 100 to adapt to different impact circumstances and the player's activity level.

In use, pressure settings are determined for the fluid modules 110a-n in the shock absorbing assembly 100. A predetermined volume of a fluid, such as gas (air or other non-flammable gas) or liquid (water or other non-flammable liquid) or mixture thereof, is pumped into the fluid modules 110a-n to reach a predetermined pressure. The control unit 120 may use default pressure settings or pressure settings received from a user. The pressure settings may be determined based on one or more of: the weight of the person, the level of anticipated impact, the type of activity, activity condition, personal preference, etc. Other factors may include the type of helmet or other type of wearable and non-wearable or other type of object implementing the shock absorbing assembly 100.

The control unit 120 includes a pressure feedback loop wherein the pressure regulator 420 adjusts the pressures of the fluid modules 110a-n responsive to the pressure measurements. The pressures of the fluid modules 110a-n may be monitored and controlled separately. The control unit 120 may monitor and adjust the pressure of the fluid modules 110a-n continuously or may monitor and adjust the pressure at predetermined intervals.

The control unit 120 adjusts the pressure by adding or removing fluid in the fluid modules 110a-n. For example, to adjust the pressure in a fluid module 110, the control unit 120 may signal the fluid pump 332 to add fluid to a fluid module 110 or signal the valve assembly 300 to release fluid from the fluid module 110. When the pressure of the fluid modules 110a-n is insufficient, fluid is injected into the system via one or more fluid lines 334 until proper pressure is achieved. When the pressure of the fluid modules 110a-n is too high, fluid is removed via one or more fluid lines 334 from the system until a predetermined pressure is achieved. If the pressure of one of the fluid modules 110a-n becomes too high during an impact, a fluid-escape vent opens, and the fluid will escape.

In another example, when an impact is detected in a first fluid module 110, the control unit 120 may control the valve assembly to release fluid from the first fluid conduit to absorb the force of the impact. For example, one or more valves are opened for the fluid to flow to a second fluid module 110 in another part of the helmet that is not affected by the impact. The ability of the impact-receiving unit 310 to absorb energy is made possible by its spring-like nature. As the fluid is received, the pressure within the member membrane increases proportional to the amount of fluid transferred without changing the volume of the member. Its behavior, then, can be represented by the spring formula whose force is equal to stiff constant, k, times fluid volume added or removed:

$$F=k*dv$$

where
dv is change in volume,
k is the stiff constant.

Currently known elastic energy-absorbing systems (such as, e.g., gel, air, fluid, and foam cushions, elastic inflatable bladder, etc.), absorb but then rebound the impact force, making it an extremely ineffective system. The current embodiments have fluid modules 110a-n that absorb impacts by transferring the impact force through movement of the fluid from the impact receiving unit 310 to the impact absorbing unit 320. This configuration permits the energy transferring process to be precise, reliable, and effective. The displaced fluid from the impact receiving unit 310 flows into one or more fluid modules 110a-n of the impact absorbing unit 320. The valve assembly 300 is configured to prevent the fluid from flowing back into the impact receiving unit 310 and generating a rebound impact force.

The shock absorbing system 100 is regenerative in that the volume of the displaced fluid to the impact-absorbing unit 320 returns to the impact-receiving unit 310 at the conclusion of the impact-diversion cycle. Upon removal of the impact force, on the basis of the pressure differential, the direction of the fluid flow reverses, and the displaced fluid will return to the impact-receiving unit 310. The fluid-ingress process terminates when the system 100 reaches an equilibrium and the energy state of the impact-receiving unit 310 is restored, resetting the system 100 to be ready for another impact.

When the impact is removed, the impact-receiving unit 310 reaches a low energy state relative to the impact-absorbing unit 320. This pressure gradient starts the energy ingress process, where the energy returns to the impact-receiving unit 310. The energy ingress process terminates when the system 100 reaches equilibrium. At the end of the energy ingress process, a high energy state of the impact-receiving unit 310 is restored, resetting the system to be ready for another impact.

When an object collides with another object, the energy is transferred, imparting a force (f). Lengthening the duration of this impact-transferring process may be desirable. For example, it would be desirable to receive the impact of a collision gradually, rather than instantaneously. By lengthening the time factor, the object will come to a stop over a longer period of time. For such a system on a headgear, lengthening the time allows the brain to slow down to a gentle stop, and avoid colliding into the skull at a high speed, thereby reducing the risk of concussion.

One way to lengthen the impact-transferring process is by reducing the rate of fluid transfer since, according to Newton's second Law, force equals mass times acceleration, and acceleration is equal to the object's change in velocity over time, as shown in the following:

$$F=m*a=m((dv/t))$$

where
m is mass of the object,
a is acceleration of the object,
dv is change in velocity,
t is time for the change in velocity to occur.

Another way to lengthen the impact-transferring process is by increasing the distance factor in the work equation below:

$$W=F*d$$

where
   W=work done by the force F
   F=Force applied to an object
   d=distance traveled by the object.

With the shock absorbing system 100, d represents the distance the impact imparting object travels during the impact-transferring process, which equals to the diameter of the impact-receiving unit 310. When the size of the impact-receiving unit 310 increases, it takes longer to transfer the impact force, provided the transfer rate remains the same.

By controlling the flow rate, the rate of velocity change or acceleration of the impacting may be calibrated. For example, decreasing the fluid flow rate will lengthen the time to complete energy transfer, which means the object will come to a stop over longer period of time.

Figure 5C:
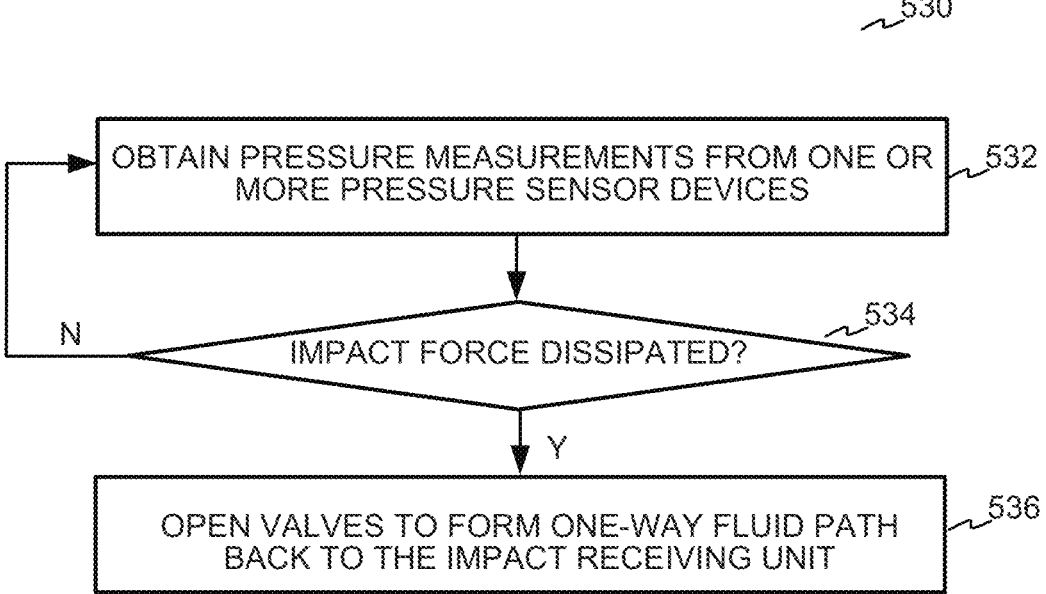

FIGS. 5A-C illustrate flow charts of exemplary methods of the shock absorbing system 100. In FIG. 5A, the method 500 of the shock absorbing system 100 includes obtaining pressure measurements from the one or more pressure sensors at 502 and determining whether the pressure needs to be adjusted in one or more of the plurality of fluid modules 110*a-n* at step 504. For example, the control unit 120 may compare the pressure measurements of a fluid module 110*a-n* to a preset pressure or a preset range of pressures for the fluid module 110*a-n*. Different fluid modules 110*a-n* may include different preset pressures or pressure ranges, e.g., depending on the size and position of the fluid module 110*a-n*. For example, the preset pressure of a fluid module 110*a-n* may be in a range between 5 pounds per square inch (psi) to 50 psi.

When the pressure does need to be adjusted, the control unit 120 may adjust the pressure at 506 by performing one or more of: controlling the fluid pump and/or fluid source to add fluid to the fluid module 110*a-n* to increase pressure, controlling the valve assembly 300 to release fluid into another fluid conduit to decrease pressure, or controlling a pressure release valve/line to remove fluid from the fluid module 110*a-n* to decrease pressure. The control unit 120 may monitor and adjust the pressure of the fluid modules 110*a-n* continuously or may monitor and adjust the pressure at predetermined intervals.

In FIG. 5B, the method 510 of the shock absorbing system 100 includes obtaining pressure measurements from the one or more pressure sensors at 512 and determining whether the pressure measurements indicate an impact has occurred in one or more of the plurality of fluid modules 110*a-n* at 514. When an impact is detected at 514, the control unit 120 determines one or more fluid modules 110*a-n* affected by the impact, e.g., designated as the "impact receiving unit" at 516. The control unit 120 then determines one or more fluid modules 110*a-n* not in the impact zone and/or affected by the impact and includes these fluid modules 110*a-n* in the "impact absorbing unit" at 518. At 520, the control unit 120 opens one or more valves 220 in the valve assembly 300 to form a one-way path for a displaced volume of the fluid to flow from the impact receiving unit to the impact absorbing unit. The valve openings may be adjusted to obtain a predetermined egress flow rate. The egress flow rate may be determined based on the increase in pressure in the impacted fluid modules 110*a-n* generated by the impact. The size of the valve opening is then adjusted to obtain the desired flow rate. In an embodiment, at 522, fluid may be added to the impacted fluid modules 110*a-n* to further dissipate the energy of the impact, e.g., in the event that all the fluid has been displaced prior to dissipating the energy of the impact.

In another example, fluid may be removed by a fluid release valve if the pressure becomes too great in the impacted fluid modules 110*a-n*.

In FIG. 5C, the method 530 of the shock absorbing system 100 includes obtaining pressure measurements from the one or more pressure sensors at 532 and determining whether the pressure measurements indicate the energy has dissipated from the impact at 534. For example, the energy has dissipated when the pressure is not changing in the impact receiving unit and/or fluid is no longer flowing from the impact receiving unit. At 536, when the energy has dissipated, the control unit 120 switches the valves 220 in the valve assembly 150 to form a one way path for the fluid to flow back from the impact absorbing unit to the impact receiving unit. The valve openings may be adjusted to obtain a predetermined ingress flow rate. The ingress flow rate may be determined based on the volume of displaced fluid, size and weight of the wearer, type of helmet, etc.

Figure 6:
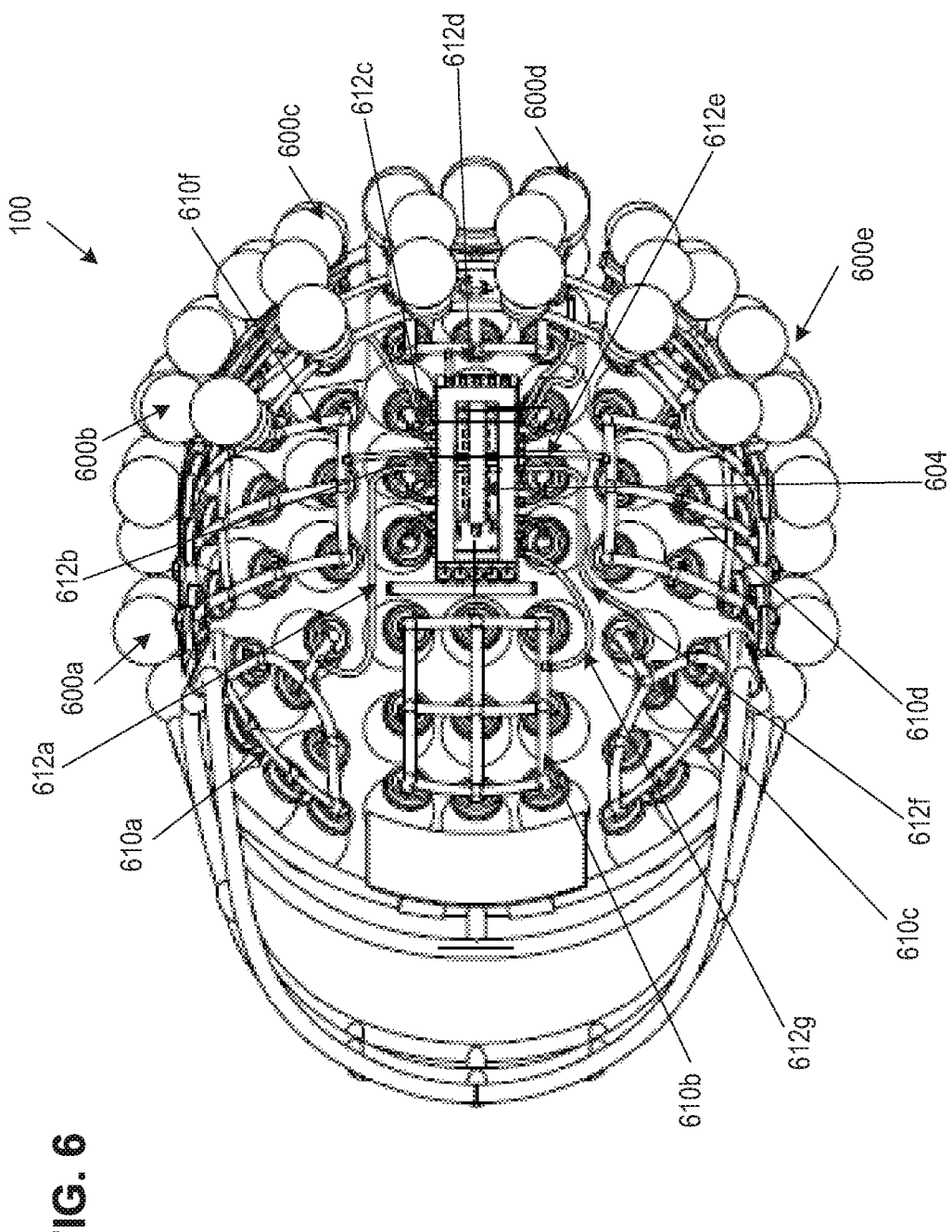
FIG. 6 illustrates a perspective view of another embodi-ment of the wearable and non-wearable shock-absorbing assembly.

FIG. 6 illustrates a perspective view of another embodiment of the wearable and non-wearable shock-absorbing assembly 100. In this embodiment, a plurality of fluid modules 600*a-n* are secured on an exterior and interior surface (not shown) of a helmet, and preferably on a majority of the exterior and interior surface of the helmet 130, e.g., covering the skull. In one example, each fluid module 600*a-n* is spherically or dome shaped with a flattened bottom portion that is secured to the exterior and interior surface of the helmet. In one embodiment, the fluid modules 600*a-n* are grouped into modular sets or units, wherein each modular unit includes a different plurality of fluid modules 600*a-n*. Each of the fluid modules 600*a-n* in a modular unit are fluidly coupled using at least one conduit assembly 610*a-f*. The modular units are coupled to each other through the valve assembly 604 and connecting fluid conduits 612*a-g*.

Figure 7:
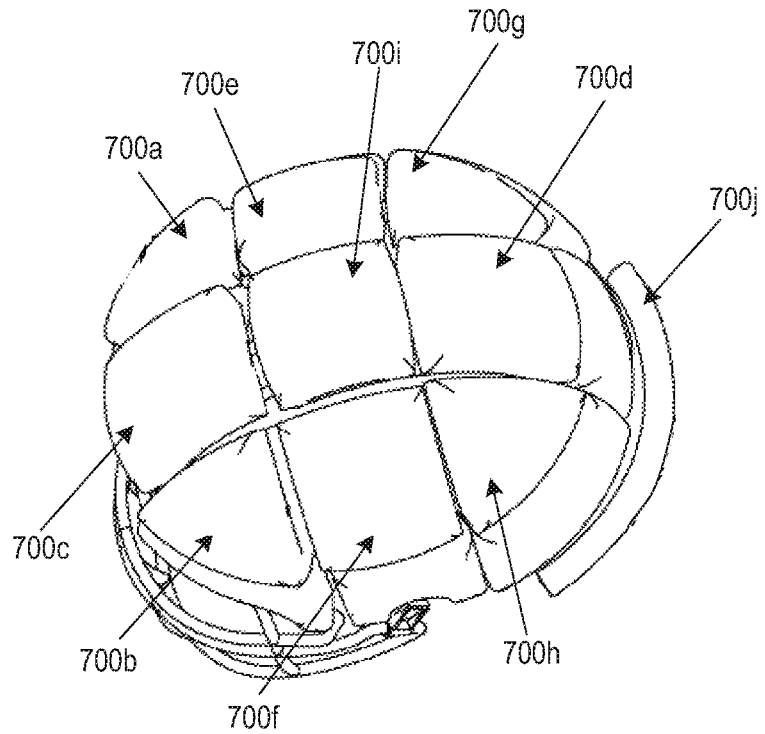
FIG. 7 illustrates a schematic block diagram of an example embodiment of a helmet with a plurality of modular units.

FIG. 7 illustrates a schematic block diagram of an example embodiment of a helmet 130 with a plurality of modular units 700*a-j*. Each modular unit 700*a-j* is paired with another modular unit 700*a-j*. For example, modular unit 700*a* is paired with modular unit 700*b*, modular unit 700*c* is paired with modular unit 700*d*, modular unit 700*e* is paired with modular unit 700*f*, modular unit 700*g* is paired with modular unit 700*h*, and modular unit 700*i* is paired with modular unit 700*j*. A pair of modular units is connected through at least one valve, e.g., in the valve assembly 604, and connecting fluid conduits 612*a-g*. When an impact occurs at one "impact-receiving" modular unit 700*a-j*, fluid flows from the impact receiving modular unit 700*a-j* through the connecting fluid conduits 612*a-j* and valve assembly 604 into the paired impact-absorbing modular unit 700*a-j*. The fluid-flow rate is adjustable by controlling the valve opening size in the valve assembly 604.

The fluid modules 600*a-n* are thus grouped into modular sets or units, wherein each modular unit 700*a-j* includes a different plurality of fluid modules 600*a-n* that are fluidly coupled using at least one conduit assembly 610*a-f*. A modular unit of fluid modules 600*a-n* and its corresponding conduit assembly 610*a-f* is called a manifold. Manifolds come in two basic types. The first type is monoblock and is made of a monolithic body that holds all the conduits and valves for the entire system. The other type is modular. A modular manifold is formed by assembling a plurality of distinct conduits/valves into a unit.

Each conduit assembly 610*a-n* forms a fluid path between the fluid modules 600*a-n* of one associated modular unit 700*a-j* and regulates the fluid flow between the fluid modules 600*a-n* using one or more valves. Disposed on either side of each fluid module 600*a-n* in a modular unit is a fluid passage and a coupling member to accept an egress and ingress fluid flow conduit. This configuration ensures a precise, reliable, and efficient control of fluid transfer within a unit.

The advantages of a modular block (e.g., a modular unit and associated conduit assembly) include flexibility, ease of repair, and ease of installation. The disadvantages of a modular block include complexity in managing a plurality of blocks since each block controls one valve. The advantages of a mono-block include low potential for leaking, efficiency of controlling of multiple valves, ease of maintenance, and compact and lighter design. The principal disadvantage of a mono-block is its lack of flexibility in that a block needs to be completely changed should a modification be required.

The manifold design is distinctive in that it combines the advantages of both a mono-block and a modular-block design. Each valve assembly is modular since it contains all the necessary functional parts and each modular unit may be removed or replaced without disturbing the function of other units or the entire system. Each pivoting ball of a valve assembly has two stems that are on the opposite poles. The first stem is rectangular shaped and the second stem, U shaped. The rectangular-shaped stem of the first valve assembly will slidably connect to the U-shaped stem of the adjacent valve assembly. In this manner, a plurality of modular valve assembly is joined to form a conjoint valve assembly or a modular monoblock.

In an alternative embodiment, there can be more than one modular monoblock. One monoblock may be for the egress-ing system and the second monoblock for the ingressing system. The advantage of having more than one valve system is the ability to control subunits of the shock-absorbing assembly differently. The non-engaging stem of the first valve assembly is provided with either a manual or electronic means of turning the conjoint valve assembly. This configuration permits adjusting the fluid-flow rate of all the valve assemblies in one simple step.

So created modular manifold is stabilized by a valve retaining member in the valve assembly 604 that is config-ured with slots to securely accommodate the plurality of connecting fluid conduits 612*a-g*. The slots in the valve retaining member help to properly orient and securely retain the connecting fluid conduits 612*a-g*. The valve assembly 604 includes valves to connect each modular unit 700*a-j* with its paired modular unit 700*a-j*. The opening of the valves may be adjusted to control flow rate between the modular units 700*a-j*.

Figure 8C:
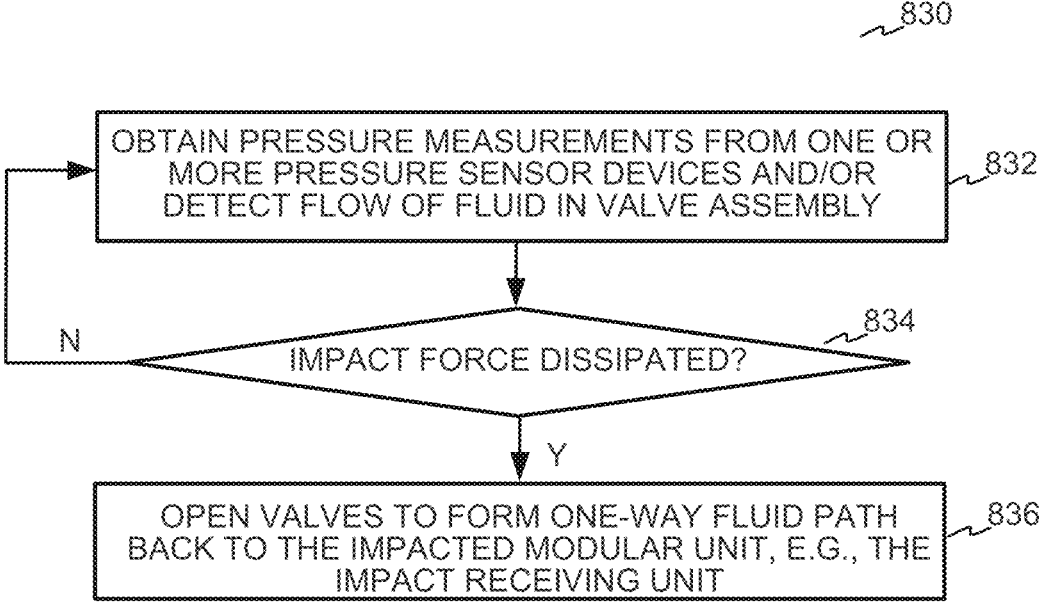

FIGS. 8A-C illustrate flow charts of exemplary methods of the shock absorbing system 100. In FIG. 8A, the method 800 of the shock absorbing system 100 includes obtaining pressure measurements from one or more pressure sensors at 802 and determining whether the pressure needs to be adjusted at 804 in one or more of the fluid modules 600*a-n* and/or the modular units 700*a-j*. For example, the control unit 120 may compare the pressure measurements of a fluid module 600*a-n* to a preset pressure or a preset range of pressures for the fluid module 600*a-n*. Different fluid mod-ules 600*a-n* or modular units 700*a-j* may include different preset pressures or pressure ranges, e.g., depending on the size and position of the fluid module 600*a-n*. For example, the preset pressure of a fluid module 600*a-n* may be in a range between 5 pounds per square inch (psi) to 50 psi.

When the pressure does need to be adjusted, the control unit 120 may adjust the pressure at 806 by performing one or more of: controlling the fluid pump and/or fluid source to add fluid to one or more fluid modules 600*a-n* in a modular unit 700*a-j* to increase pressure, controlling the valve assem-bly 604 to release fluid into another modular unit 700*a-j* to decrease pressure, or controlling a pressure release valve/line to remove fluid from the fluid module 600*a-n* or modular unit 700*a-j* to decrease pressure. A control unit 120 may monitor and adjust the pressure of the fluid modules 600*a-n* continuously or may monitor and adjust the pressure at predetermined intervals.

In FIG. 8B, the method 810 of the shock absorbing system 100 includes obtaining pressure measurements from the one or more pressure sensors at 812 and determining whether the pressure measurements indicate an impact has occurred in one or more of the plurality of modular units 700*a-j*. When an impact is detected at 814, the control unit 120 determines at least one modular unit 700*a-j* affected by the impact, e.g., designated as the "impact receiving unit" at 816. The control unit 120 then determines the paired modular unit 700*a-j* and, at 818, opens a valve in the valve assembly 604 to the paired modular unit 700*a-j*, e.g., the "impact absorbing unit." The valve opening may be adjusted to obtain a predetermined egress flow rate for the displaced volume of the fluid. The egress flow rate may be determined based on the increase in pressure in the modular unit 700*a-j* generated from the impact. The size of the opening, e.g., diameter of the opening, of the valve 220 is then adjusted to obtain the determined flow rate. In an embodiment, fluid may be added to the impact receiving unit to further dissipate the energy of the impact, e.g., in the event that all the fluid has been displaced prior to dissipating the energy of the impact. In another embodiment, fluid may be removed by a fluid release valve if the pressure becomes too great in the impact receiving unit.

In FIG. 8C, the method 830 of the shock absorbing system 100 includes obtaining pressure measurements from the one or more pressure sensors after the impact at 832 and deter-mining whether the pressure measurements indicate the energy has dissipated from the impact at 834. For example, the energy has dissipated when the pressure is not changing in the impact receiving unit and/or fluid is no longer flowing from the impact receiving unit through the valve assembly 604 to the impact absorbing unit. At 836, when the impact force has dissipated, the control unit 120 switches the valves in the valve assembly 630 to form a one way path for the fluid to flow back from the impact absorbing unit to the impact receiving unit, e.g., the impacted modular unit 700*a-j*. The valve openings may be adjusted to obtain a predetermined ingress flow rate. The ingress flow rate may be determined based on the volume of displaced fluid, size and weight of the wearer, type of helmet, etc.

Figure 9:
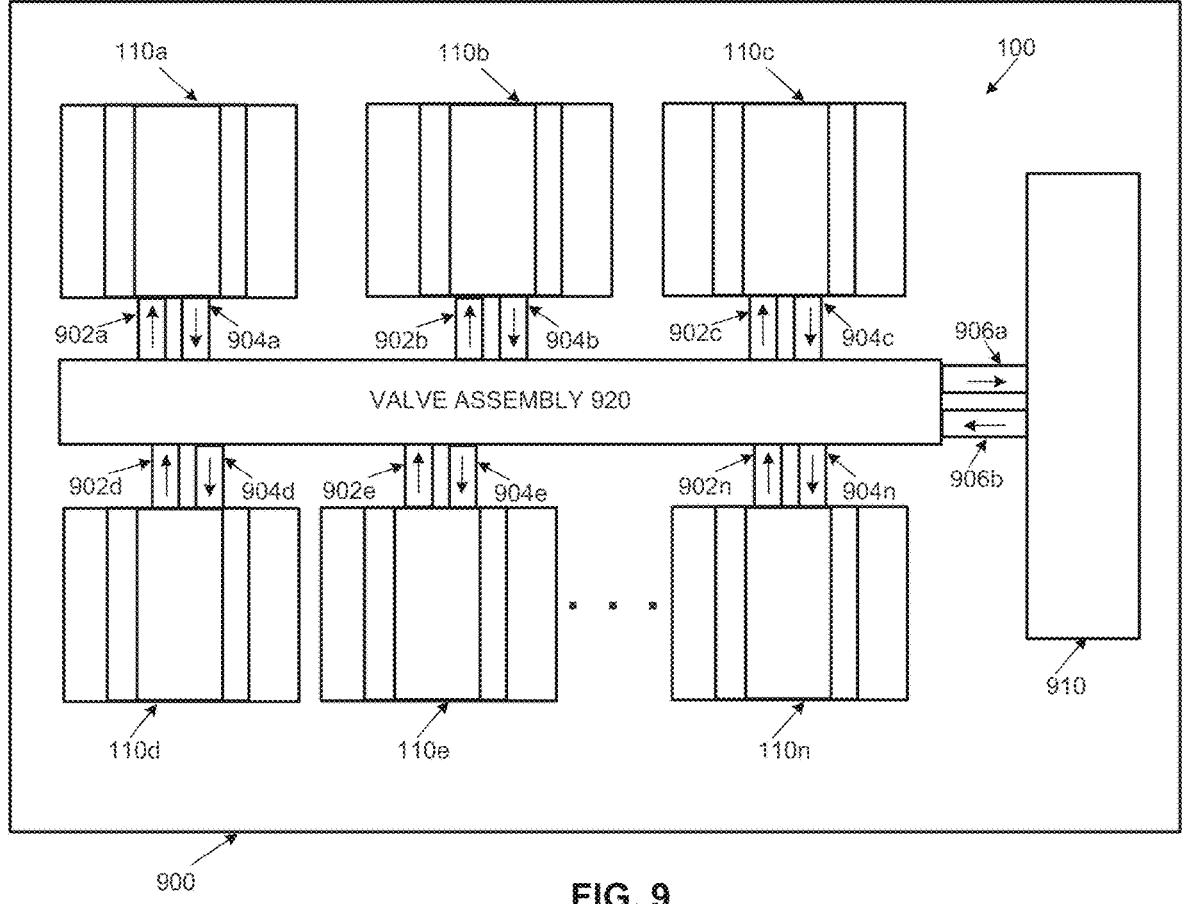
FIG. 9 illustrates a schematic block diagram of an embodiment of the shock absorbing assembly implemented within a wall.

FIG. 9 illustrates a schematic block diagram of an embodiment of the shock absorbing assembly 100 imple-mented within a wall 900. The wall 900 may be a car door, a highway barrier, a shipping container wall or floor, etc. The plurality of fluid modules 110*a-n* are configured, uniformly or non-uniformly, in various sizes and shapes depending on the use. For example, for a car door, the fluid modules 110*a-n* may be 6-36 inch long cylindrical tubes and/or spherical shapes with 1-12 inch diameters, or other size or shape. In another example, for a highway barrier, the fluid modules 110*a-n* may be 1-6 feet cylinders and/or spherical shapes with 12-48 inch diameters, or other size or shape.

The plurality of fluid modules 110*a-n* are each fluidly coupled to a valve assembly 920 by an ingress conduit 902*a-n* and an egress conduit 904*a-n*. The valve assembly 920 includes a fluid passage and a coupling member to accept each of the ingress conduits 902*a-n* and the egress conduits 904*a-n*. The valve assembly 920 restricts the flow of fluid in only one direction at a time (either ingressing or egressing). The ingress and egress flow rates may be set separately.

In one embodiment, the valve assembly 920 may couple or pair a first fluid module 110*a-n* to a second fluid module 110*a-n*, e.g., either dynamically upon an impact or precon- figured prior to any impacts. When an impact occurs at one of the paired first and second fluid modules 110*a-n* ("impact- receiving module"), the fluid flows to the other one of the paired first and second fluid modules ("impact-absorbing module"), as described herein. When the force of the impact is dissipated, the fluid flows back from the impact absorbing module to the impact-receiving module. In another embodi- ment, the valve assembly 920 may couple an impact- receiving module to a fluid reservoir 910. The fluid flows from the impact-receiving module through the valve assem- bly 920 and an ingress reservoir conduit 906*a* and into the fluid reservoir 910. When the force of the impact is dissi- pated, the fluid flows from the fluid reservoir 910, through the egress reservoir conduit 906*b* and valve assembly 920 and back into the impact receiving module. The fluid res- ervoir 910 may, additionally or alternatively, be used to fill the fluid modules 110*a-n*.

Figure 10:
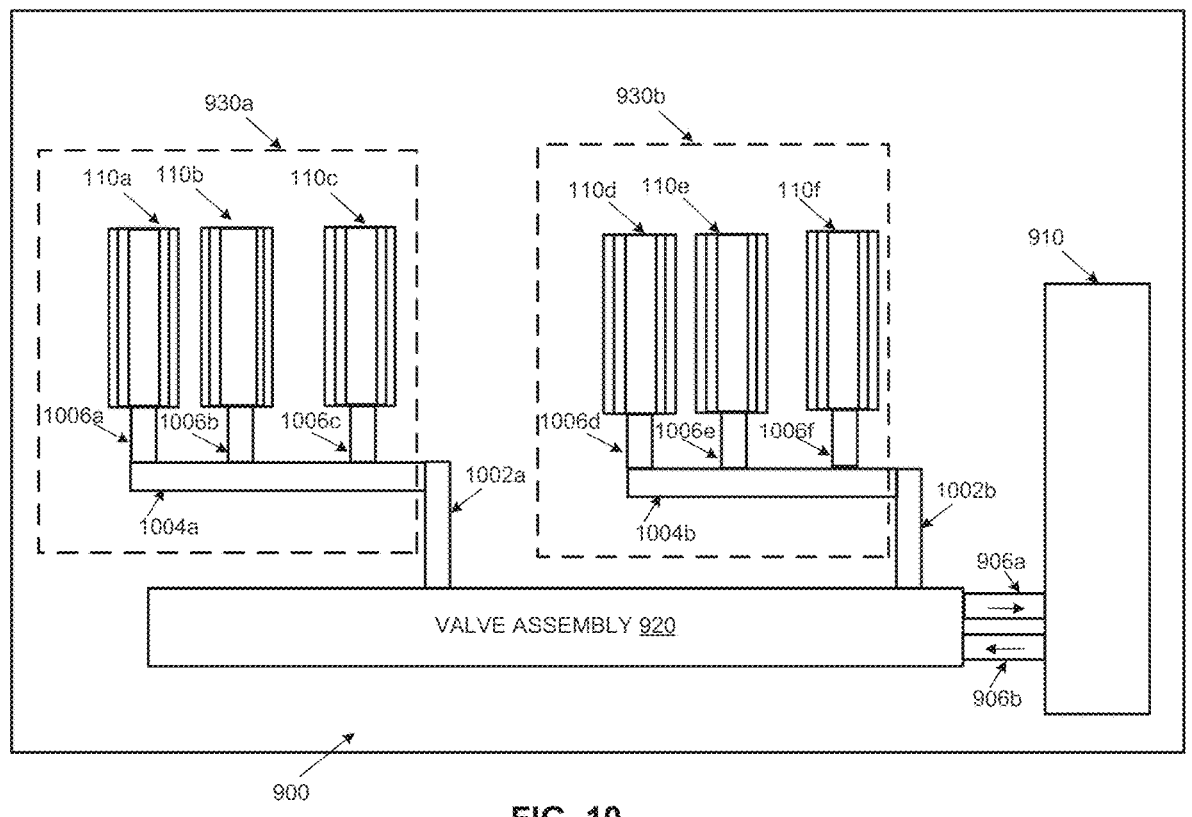
FIG. 10 illustrates a schematic block diagram of another embodiment of the shock absorbing assembly implemented within a wall.

FIG. 10 illustrates a schematic block diagram of another embodiment of the shock absorbing assembly 100 imple- mented within a wall 900. In this embodiment, the fluid modules 110*a-n* are grouped into modular sets or units 930*a-b*, wherein each modular unit 930*a-b* includes a dif- ferent plurality of fluid modules 110*a-n*. For example, fluid modules 110*a-c* are coupled in a first modular unit 930*a* and fluid modules 110*d-n* are coupled in a second modular set 930*b*. Each of the fluid modules 110*a-n* in a modular unit 930*a-b* are fluidly coupled to each other using at least one conduit assembly 1004*a-b*. The conduit assembly 1004 may be coupled directly to fluid modules 110*a-n* within the modular unit 930*a-b* and/or connected using ingress/egress conduits 1006*a-f*. The modular units 930*a-b* are coupled to each other through the valve assembly 920 and the connect- ing fluid conduits 1002*a-b*. Though only two modular units 930*a-b* are illustrated, three or more modular units 930*a-b* or only a single modular unit 930 may be implemented. In addition, though three fluid modules 110 are illustrated within a modular unit 930, a different number of fluid modules 110 may be implemented within a modular unit 930, and the number of fluid modules 110 may be varied between different modular units 930.

When an impact occurs at one of the modular units 930*a-b* ("impact-receiving module unit"), the fluid flows to another paired modular unit 930*a-b* ("impact-absorbing module unit"), as described herein. When the force of the impact is dissipated, the fluid flows back from the impact absorbing module unit to the impact-receiving module unit. In another embodiment, the valve assembly 920 may couple an impact- receiving module unit to the fluid reservoir 910. The fluid flows from the impact-receiving module through the valve assembly 930 and the ingress reservoir conduit 906*a* into the fluid reservoir 910. When the force of the impact is dissi- pated, the fluid flows from the fluid reservoir 910, through the egress reservoir conduit 906*b* and valve assembly 920 and back into the impact receiving module unit. The fluid reservoir 910 may, additionally or alternatively, be used to fill the fluid modules 110*a-n*.

The embodiments of the shock absorbing assembly 100 herein help remove the "rebound" force, e.g., in wearable objects such as helmets. For example, currently known elastic energy-absorbing systems (such as, e.g., gel, air, fluid, and foam cushions, elastic inflatable bladder, etc.) in helmets absorb but then rebound an impact force, making it an extremely ineffective system. The current embodiments have fluid modules that absorb impacts by transferring the impact force through movement of the fluid from an impact receiving unit to an impact absorbing unit. The displaced fluid from the impact receiving unit flows into one or more fluid modules of the impact absorbing unit. A valve or valve assembly is configured to prevent the fluid from flowing back into the impact receiving unit and generating a rebound force. This configuration permits the energy transferring process to be precise, reliable, and effective without gener- ating a rebound force. Though a helmet is described in detail herein, the shock absorbing system 100 may be imple- mented with other wearable items, such as body armor, knee pads, elbow pads, shoes, etc. The shock absorbing system 100 may also be used on other non-wearable objects, such as walls, floors, fragile packages during transport, etc. The shock absorbing system 100 may thus be configured for many different implementations and uses to absorb impact forces while helping to minimize rebound effects.

As may be used herein, the term "operable to" or "con- figurable to" indicates that an element includes one or more of circuits, instructions, modules, data, input(s), output(s), etc., to perform one or more of the described or necessary corresponding functions and may further include inferred coupling to one or more other items to perform the described or necessary corresponding functions. As may also be used herein, the term(s) "coupled," "coupled to," "connected to" and/or "connecting" or "interconnecting" includes direct connection or link between nodes/devices and/or indirect connection between nodes/devices via an intervening item.

As may further be used herein, inferred connections (i.e., where one element is connected to another element by inference) includes direct and indirect connection between two items in the same manner as "connected to." As may be used herein, the terms "substantially" and "approximately" provides an industry-accepted tolerance for its correspond- ing term and/or relativity between items.

Note that the aspects of the present disclosure may be described herein as a process that is depicted as a schematic, a flowchart, a flow diagram, a structure diagram, or a block diagram. Although a flowchart may describe the operations as a sequential process, many of the operations can be performed in parallel or concurrently. In addition, the order of the operations may be re-arranged. A process is termi- nated when its operations are completed. A process may correspond to a method, a function, a procedure, a subrou- tine, a subprogram, etc. When a process corresponds to a function, its termination corresponds to a return of the function to the calling function or the main function.

The various features of the disclosure described herein can be implemented in different systems and devices without departing from the disclosure. It should be noted that the foregoing aspects of the disclosure are merely examples and are not to be construed as limiting the disclosure. The description of the aspects of the present disclosure is intended to be illustrative, and not to limit the scope of the claims. As such, the present teachings can be readily applied to other types of apparatuses and many alternatives, modi- fications, and variations will be apparent to those skilled in the art.

In the foregoing specification, certain representative aspects have been described with reference to specific examples. Various modifications and changes may be made, however, without departing from the scope of the present invention as set forth in the claims. The description and figures herein are illustrative, rather than restrictive, and modifications are intended to be included within the scope of the present invention. Accordingly, the scope of the invention should be determined by the claims and their legal equivalents rather than by merely the examples described. For example, the components and/or elements recited in any apparatus claims may be assembled or otherwise operationally configured in a variety of permutations and are accordingly not limited to the specific configuration recited in the claims.

Furthermore, certain benefits, other advantages and solutions to problems have been described above with regard to particular embodiments; however, any benefit, advantage, solution to a problem, or any element that may cause any particular benefit, advantage, or solution to occur or to become more pronounced are not to be construed as critical, required, or essential features or components of any or all the claims.

As used herein, the terms "comprise," "comprises," "comprising," "having," "including," "includes" or any variation thereof, are intended to reference a nonexclusive inclusion, such that a process, method, article, composition or apparatus that comprises a list of elements does not include only those elements recited, but may also include other elements not expressly listed or inherent to such process, method, article, composition, or apparatus. Other combinations and/or modifications of the above-described structures, arrangements, applications, proportions, elements, materials, or components used in the practice of the present invention, in addition to those not specifically recited, may be varied or otherwise particularly adapted to specific environments, manufacturing specifications, design parameters, or other operating requirements without departing from the general principles of the same.

Moreover, reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is intended to be construed under the provisions of 35 U.S.C. § 112(f) as a "means-plus-function" type element, unless the element is expressly recited using the phrase "means for" or, in the case of a method claim, the element is recited using the phrase "step for."

The invention claimed is:

1. A shock-absorbing assembly implemented on a device, comprising:
   a plurality of impact-diverting modules attached to the device, wherein each of the plurality of impact-diverting modules is fluidly isolated and wherein each of the plurality of impact-diverting modules comprises:
      a pair of impact units, including a first impact unit having a first volume of fluid and a second impact unit having a second volume of fluid, wherein when the first impact unit receives an external impact, a displaced volume of the fluid is forced to egress from the first impact unit and enter the second impact unit;
      an egress fluid conduit that conducts the displaced volume of the fluid from the first impact unit;
      a first one-way valve that controls an egress flow rate of the displaced volume of the fluid from the first impact unit, wherein the first one-way valve allows a unidirectional egress flow of the displaced volume of the fluid and prevents an ingress flow of the displaced volume of the fluid;
      an ingress fluid conduit that conducts the displaced volume of the fluid from the second impact unit back to the first impact unit;
      a second one-way valve that controls an ingress flow rate of the displaced volume of fluid from the second impact unit back into the first impact unit and prevents an egress flow of the displaced volume of the fluid from the first impact unit into the ingress fluid conduit; and
      wherein a position of the first impact unit on the device in each of the plurality of impact-diverting modules is different from a position of the second impact unit on the device in a corresponding one of the plurality of impact-diverting modules such that the external impact is unlikely to affect both the first impact unit and the second impact unit.

2. The shock-absorbing assembly of claim 1, further comprising:
   a control unit that controls an opening of the first one-way valve and the second one-way valve to regulate the egress flow rate and the ingress flow rate of the displaced volume of the fluid between the first impact unit and the second impact unit.

3. The shock-absorbing assembly of claim 2, further comprising:
   a pressure sensor system for obtaining a pressure measurement for the fluid in each of the plurality of impact-diverting modules; and
   wherein the control unit increases or decreases a volume of the fluid in one or more of the plurality of impact-diverting modules in response to the pressure measurement.

4. The shock-absorbing assembly of claim 3, further comprising:
   a pressurized fluid source and/or a fluid pump; and
   a fluid-conducting line fluidly coupled from the pressurized fluid source or the fluid pump and to the plurality of impact-diverting modules.

5. The shock-absorbing assembly of claim 2, wherein the control unit further controls the opening of the first one-way valve and the second one-way valve to regulate the ingress flow rate and the egress flow rate of the displaced volume of the fluid between the first impact unit and the second impact unit, wherein the egress flow rate and the ingress flow rate may be a same flow rate or a different flow rate.

6. The shock-absorbing assembly of claim 1, wherein each of the plurality of impact-diverting modules is a closed, self-contained system without any fluid connections to other of the plurality of impact-diverting modules.

7. The shock-absorbing assembly of claim 1, wherein when the second impact unit receives another external impact, another displaced volume of the fluid is forced to egress from the second impact unit and enter the first impact unit; and
   wherein the first impact unit and the second impact unit are substantially similar or equal in construction and size.

8. The shock-absorbing assembly of claim 1, wherein each of the plurality of impact-diverting modules is preloaded with the fluid at a pressure within a range between 5 pounds per square inch (psi) and 50 psi.

9. The shock-absorbing assembly of claim 1, wherein the first impact unit comprises a first plurality of fluid modules that are interconnected by a first fluid-conducting conduit; and wherein the second impact unit comprises a second plurality of fluid modules that are interconnected by a second fluid-conducting conduit.

10. The shock-absorbing assembly of claim 1, wherein a pre-load pressure, density and arrangement of the first impact unit and the second impact unit in each of the plurality of impact-diverting modules on the device are determined by parameters including one or more of: a weight of a user, a height of the user, a level of anticipated impact force, a type of activity, an activity condition, and a personal preference.

11. The shock-absorbing assembly of claim 1, wherein both the first impact unit and the second impact unit comprise at least an outer relatively non-elastic layer and an inner liquid-tight, relatively elastic layer.

12. The shock-absorbing assembly of claim 1, wherein both the first impact unit and the second impact unit are configured to be flexible but not elastic, wherein a volume of the first impact unit and the second impact are fixed, and wherein a pressure of the first impact unit and the second impact unit is variable in proportion to a volume of the fluid.

13. The shock-absorbing assembly of claim 1, wherein an outer layer of the first impact unit and an outer layer of the second impact unit comprise one or more of: graphite fibers, nylon fibers, ceramic fibers, polyethylene fibers, glass fibers, or aramid or polyaramid poly (phenylene diamine terephthalamide) fabric.

14. The shock-absorbing assembly of claim 13, wherein an inner layer of the first impact unit and an inner layer of the second impact unit comprise one or more of: rubber, silicone, thermoplastic polyurethane, or neoprene.

15. The shock-absorbing assembly of claim 1, wherein the first one-way valve and the second one-way valve comprise at least one of: a plug-type valve, ball-type valve, or butterfly-type valve, and wherein a plurality of the valves are organized to form a modular monoblock.

16. The shock-absorbing assembly of claim 1, wherein the device comprises a wearable device, including at least one of: a helmet, a shoe, protective body gear, elbow pad or knee pad.

17. The shock-absorbing assembly of claim 1, wherein the device comprises a non-wearable device, including at least one of: a wall, a floor, or a container.

18. The shock-absorbing assembly of claim 1, wherein the device comprises a helmet, wherein the plurality of impact-diverting modules are attached to at least one of: an internal surface of the helmet, an external surface of the helmet, or both the internal surface and the external surface of the helmet.

19. The shock-absorbing assembly of claim 1, wherein the fluid is a liquid, gel, or air.

20. A shock-absorbing assembly implemented on a device, comprising:

a plurality of impact-diverting modules attached to the device, wherein each of the plurality of impact-diverting modules is fluidly isolated and wherein each of the plurality of impact-diverting modules comprises:

a pair of fluid modules including a first fluid module and a second fluid module that are fluidly connected, wherein a position of the first fluid module on the device is different from a position of the second fluid module on the device such that an external impact is unlikely to affect both the first fluid module and the second fluid module, wherein a force of a first impact on the first fluid module causes a first volume of displaced liquid from the first fluid module to flow into the second fluid module; and wherein a force of a second impact on the second fluid module causes a second volume of displaced liquid from the second fluid module to flow into the first fluid module, a valve system configured to:

in response to the first impact on the first fluid module, control a first egress flow rate of the first volume of displaced liquid from the first fluid module to the second fluid module; and in response to the second impact to the second fluid module, control a second egress flow rate of the second volume of displaced liquid from the second fluid module to the first fluid module; and an egress fluid conduit that conducts the first volume of displaced liquid from the first fluid module and a separate ingress fluid conduit that conducts the first volume of displaced liquid from the second fluid module back to the first fluid module.

\* \* \* \* \*